US009299122B2

(12) United States Patent
Okruhlica et al.

(10) Patent No.: US 9,299,122 B2
(45) Date of Patent: Mar. 29, 2016

(54) NEIGHBOR CONTEXT PROCESSING IN BLOCK PROCESSING PIPELINES

(71) Applicant: Apple Inc., Cupertino, CA (US)

(72) Inventors: Craig M. Okruhlica, San Jose, CA (US); Guy Cote, San Jose, CA (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 14/037,316

(22) Filed: Sep. 25, 2013

(65) Prior Publication Data

US 2015/0084969 A1  Mar. 26, 2015

(51) Int. Cl.
*G06T 1/20* (2006.01)
*G06T 1/60* (2006.01)
*H04N 19/61* (2014.01)
*H04N 19/423* (2014.01)
*H04N 19/436* (2014.01)

(52) U.S. Cl.
CPC ... *G06T 1/20* (2013.01); *G06T 1/60* (2013.01); *H04N 19/423* (2014.11); *H04N 19/436* (2014.11); *H04N 19/61* (2014.11)

(58) Field of Classification Search
CPC ... H04N 19/176; H04N 19/593; H04N 19/56; H04N 19/159; H04N 19/43; H04N 19/51; G06T 1/20; G06T 2207/10016; G06T 2207/20021
See application file for complete search history.

(56) References Cited

U.S. PATENT DOCUMENTS

| 6,005,624 | A  | 12/1999 | Vainsencher |
| 7,725,745 | B2 | 5/2010 | Gabor et al. |
| 7,768,520 | B2 | 8/2010 | Deb |
| 7,822,116 | B2 | 10/2010 | Hinds |
| 7,929,599 | B2 | 4/2011 | Ganesh et al. |
| 8,068,545 | B2 | 11/2011 | Penna et al. |
| 8,213,511 | B2 | 7/2012 | Swami et al. |
| 8,284,844 | B2 | 10/2012 | Macinnis et al. |
| 8,320,448 | B2 | 11/2012 | Zhao et al. |
| 8,379,718 | B2 | 2/2013 | Wang et al. |
| 8,488,673 | B2 | 7/2013 | Dencher |

(Continued)

FOREIGN PATENT DOCUMENTS

WO     2013107906     7/2013

OTHER PUBLICATIONS

U.S. Appl. No. 14/039,820, filed Sep. 27, 2013, Guy Cote, et al.

(Continued)

*Primary Examiner* — Hau Nguyen
(74) *Attorney, Agent, or Firm* — Robert C. Kowert; Meyertons, Hood, Kivlin, Kowert & Goetzel, P.C.

(57) ABSTRACT

A block processing pipeline in which blocks are input to and processed according to row groups so that adjacent blocks on a row are not concurrently at adjacent stages of the pipeline. A stage of the pipeline may process a current block according to neighbor pixels from one or more neighbor blocks. Since adjacent blocks are not concurrently at adjacent stages, the left neighbor of the current block is at least two stages downstream from the stage. Thus, processed pixels from the left neighbor can be passed back to the stage for use in processing the current block without the need to wait for the left neighbor to complete processing at a next stage of the pipeline. In addition, the neighbor blocks may include blocks from the row above the current block. Information from these neighbor blocks may be passed to the stage from an upstream stage of the pipeline.

20 Claims, 18 Drawing Sheets

(56) References Cited

U.S. PATENT DOCUMENTS

| | | |
|---|---|---|
| 8,532,383 B1 | 9/2013 | Thakkar et al. |
| 2004/0042669 A1 | 3/2004 | Jeon et al. |
| 2005/0169371 A1 | 8/2005 | Lee et al. |
| 2010/0053304 A1 | 3/2010 | Underkoffler et al. |
| 2010/0142623 A1 | 6/2010 | Vaduganathan et al. |
| 2012/0014439 A1 | 1/2012 | Segall et al. |
| 2012/0076207 A1 | 3/2012 | Schmit et al. |
| 2012/0099657 A1 | 4/2012 | Tanaka et al. |
| 2012/0140822 A1 | 6/2012 | Wang et al. |
| 2012/0287995 A1 | 11/2012 | Budagavi |
| 2013/0003837 A1 | 1/2013 | Yu et al. |
| 2013/0101029 A1* | 4/2013 | Srinivasan et al. ....... 375/240.12 |
| 2013/0182774 A1 | 7/2013 | Wang et al. |
| 2013/0188702 A1 | 7/2013 | Li et al. |
| 2014/0072040 A1* | 3/2014 | Mathew et al. .......... 375/240.13 |

OTHER PUBLICATIONS

U.S. Appl. No. 14/039,764, filed Sep. 27, 2013, Timothy John Millet.
U.S. Appl. No. 14/037,313, filed Sep. 25, 2013, Joseph J. Cheng, et al.
U.S. Appl. No. 14/039,729, filed Sep. 27, 2013, James E. Orr et al.
U.S. Appl. No. 14/037,310, filed Sep. 25, 2013, Guy Cote, et al.
ITU-T H2.64 "Series H: Audiovisual and Multimedia Systems Infrastructure of Audiovisual Services—Coding of Moving Video—Advanced video coding for generic audiovisual services" Apr. 2013 pp. 1-732.

* cited by examiner

| 4x4 sub-block 304A | 4x4 sub-block 304B | 4x4 sub-block 304C | 4x4 sub-block 304D |
|---|---|---|---|
| 4x4 sub-block 304E | 4x4 sub-block 304F | 4x4 sub-block 304G | 4x4 sub-block 304H |
| 4x4 sub-block 304I | 4x4 sub-block 304J | 4x4 sub-block 304K | 4x4 sub-block 304L |
| 4x4 sub-block 304M | 4x4 sub-block 304N | 4x4 sub-block 304O | 4x4 sub-block 304P |

| 0 | 1 | 4 | 5 |
|---|---|---|---|
| 2 | 3 | 6 | 7 |
| 8 | 9 | 12 | 13 |
| 10 | 11 | 14 | 15 |

*FIG. 8A*

| 0 | 1 | 2 | 4 |
|---|---|---|---|
| 3 | 5 | 6 | 8 |
| 7 | 9 | 10 | 12 |
| 11 | 13 | 14 | 15 |

*FIG. 8B*

NEIGHBOR CONTEXT PROCESSING IN BLOCK PROCESSING PIPELINES

BACKGROUND

1. Technical Field

This disclosure relates generally to video or image processing, and more specifically to methods and apparatus for processing digital video frames in block processing pipelines.

2. Description of the Related Art

Various devices including but not limited to personal computer systems, desktop computer systems, laptop and notebook computers, tablet or pad devices, digital cameras, digital video recorders, and mobile phones or smart phones may include software and/or hardware that my implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 10 as shown in FIG. 1 represents an apparatus, or alternatively a software program, in which digital video input (input frames 90) is encoded or converted into another format (output frames 92), for example a compressed video format such as H.264/Advanced Video Coding (AVC) format (also referred to as MPEG 4 Part 10), according to a video encoding method. An apparatus or software program such as a video encoder 10 may include multiple functional components or units, as well as external interfaces to, for example, video input sources and external memory.

In some video processing methods, to perform the processing, each input video frame 90 is divided into rows and columns of blocks of pixels (e.g., 16×16 pixel blocks), for example as illustrated in FIG. 2 which shows an example 192×192 pixel frame divided into 144 16×16 pixel blocks. Each block of an input video frame 90 is processed separately, and when done the processed blocks are combined to form the output video frame 92. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 10 may include or implement a block processing pipeline 40. A block processing pipeline 40 may include two or more stages, with each stage implementing one or more of the steps or operations of the block processing method. FIG. 1 shows an example video encoder 10 that implements an example block processing pipeline 40 that includes at least stages 42A through 42C. A block is input to a stage 42A of the pipeline 40, processed according to the operation(s) implemented by the stage 42A, and results are output to the next stage 42B (or as final output by the last stage 42). The next stage 42B processes the block, while a next block is input to the previous stage 42A for processing. Thus, blocks move down the pipeline from stage to stage, with each stage processing one block at a time and multiple stages concurrently processing different blocks. Conventionally, the blocks are input to and processed by the block processing pipeline 40 in scan order as shown in FIG. 2. For example, in FIG. 1, the first block of the first row of the frame shown in FIG. 2 (block 0) is at stage 42C, the second block (block 1) is at stage 42B, and the third block (block 2) is at stage 42A. The next block to be input to the block processing pipeline 40 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union—Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

SUMMARY OF EMBODIMENTS

Embodiments of block processing methods and apparatus are described in which at least one stage of a block processing pipeline processes blocks of pixels from a frame according to neighbor pixels from one or more previously processed neighbor blocks of the frame. The block processing pipeline may include multiple stages for processing blocks of pixels from a video frame. Blocks may be input to and processed in the pipeline according to row groups so that adjacent blocks on a row are not concurrently at adjacent stages of the pipeline. At least one stage of the pipeline may need to process a current block according to neighbor pixels from one or more neighbor blocks including but not limited to the left neighbor block. Since adjacent blocks are not concurrently at adjacent stages, the left neighbor of the current block will be at least two stages downstream from the stage. Thus, processed pixels from the left neighbor block can be passed back to an upstream stage for use in processing the current block without the need to wait for the left neighbor block to complete processing at a next stage of the pipeline. In addition, the neighbor blocks may include one or more previously processed blocks from the row above the current block. Information from these neighbor blocks may be passed to the stage from an upstream stage of the pipeline.

As an example, the stage may be an intra-frame estimation stage configured to determine a best intra mode for a current macroblock according to previously processed neighbor pixels from the left and above neighbor macroblocks of the current macroblock and output the best intra mode for the current macroblock to the next stage in the pipeline (e.g., a mode decision stage). The left neighbor pixels may be passed back to the intra-frame estimation stage from a downstream stage (e.g., a luma reconstruction stage) that may be two or more stages downstream, while above neighbor pixels may be received from an upstream stage.

In at least some embodiments, the inter-frame estimation stage may separately process 4×4, 8×8, and 16×16 sub-blocks of the current frame to determine the best mode for the macroblock at each sub-block size, and then determine a best intra mode for the macroblock from among the three determined best modes. For 4×4 and 8×8 processing, each sub-block may be reconstructed according to a best mode determined for the respective sub-block, and reconstructed pixels from at least one reconstructed sub-block may be fed back and used as neighbor pixels when processing at least one subsequent subblock of the macroblock in the 4×4 and 8×8 sub-block processing pipelines.

In at least some embodiments, in processing 4×4 subblocks in a 4×4 sub-block processing pipeline, the sub-blocks may be input and processed in a modified "knight's order" to reduce the need to wait for the previous sub-block to complete and, thus, make more efficient use of the 4×4 sub-block processing pipeline.

BRIEF DESCRIPTION OF THE DRAWINGS

FIGS. 8A and 8B graphically illustrate order input methods for 4×4 sub-block processing, according to at least some embodiments.

Figure 1:
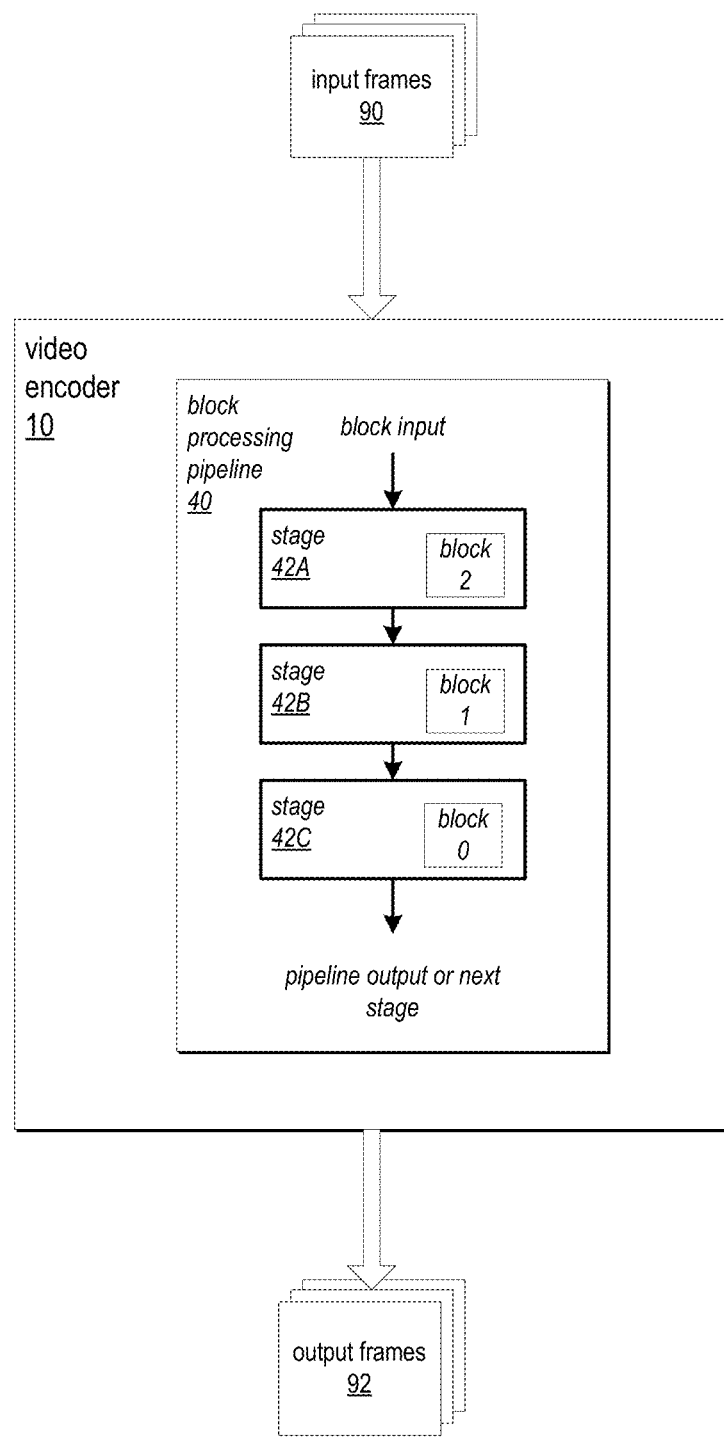
FIG. 1 illustrates an example video encoder including a conventional block processing pipeline that processes blocks from input frames in scan order.
Figure 2:
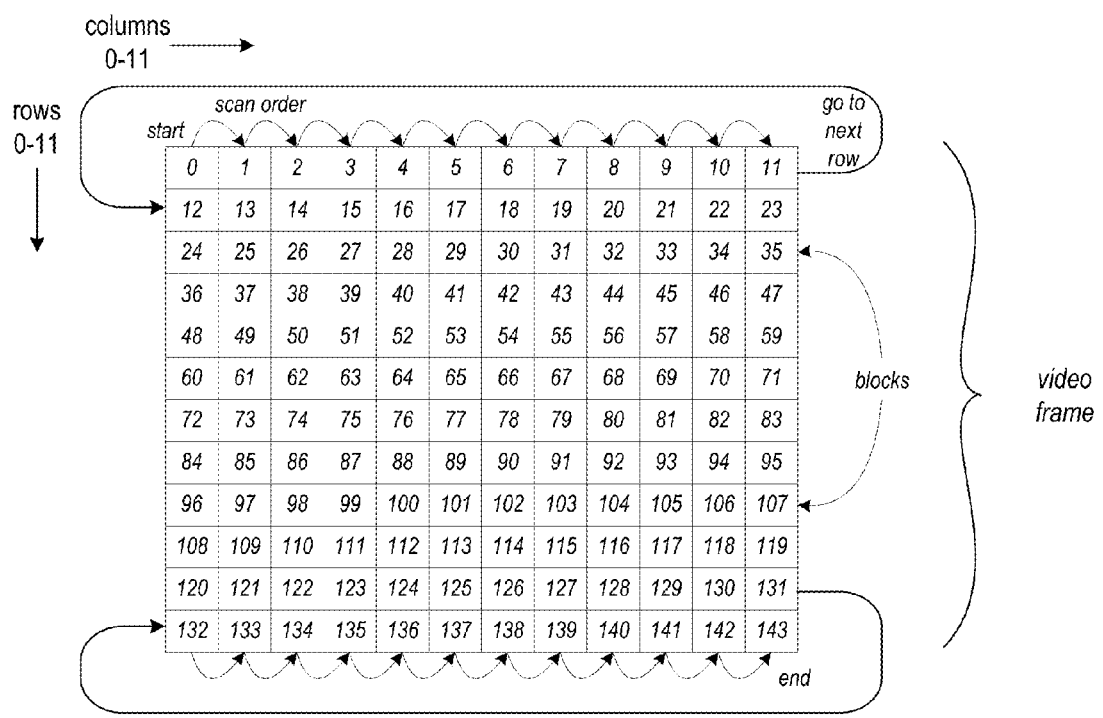
FIG. 2 illustrates conventional scan order processing of blocks from a video frame.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 16:
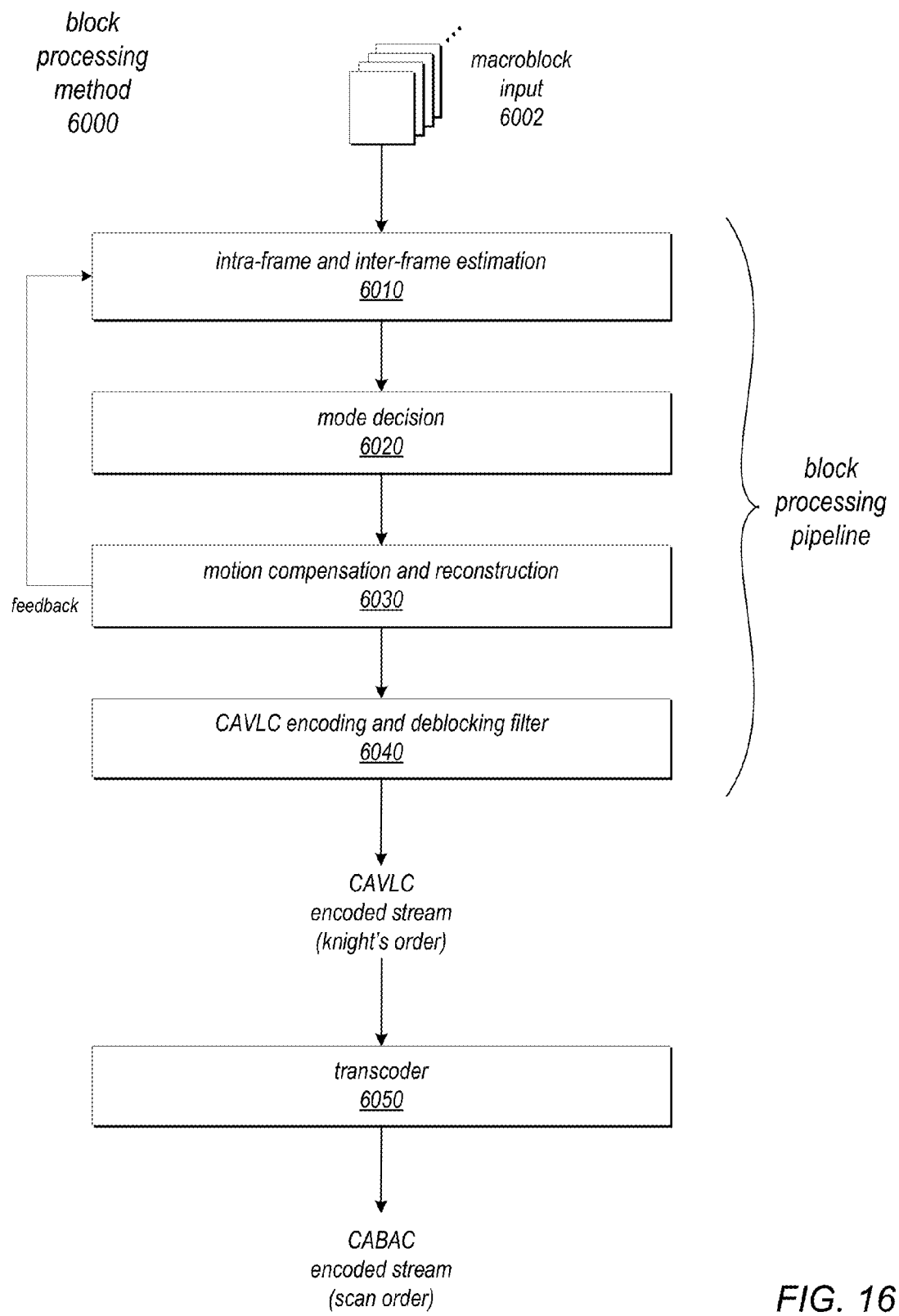
FIG. 16 is a high-level block diagram of general operations in an example block processing method that may be implemented by a block processing pipeline that implements one or more of the block processing methods and apparatus described herein, according to at least some embodiments.
Figure 17:
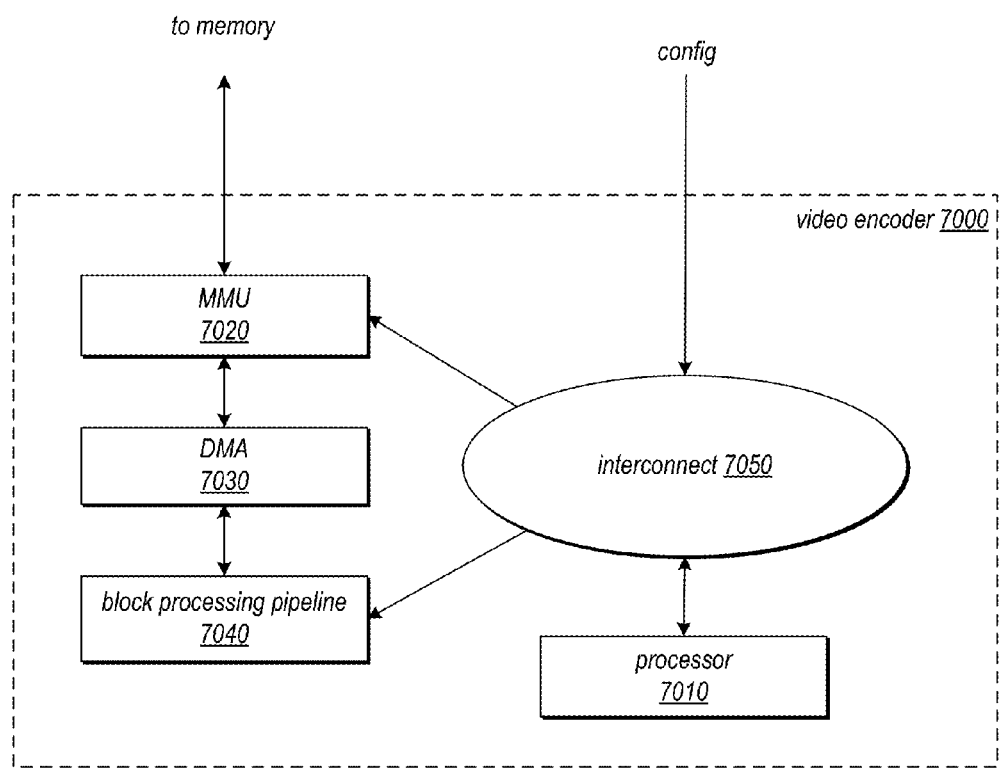
FIG. 17 is a block diagram of an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 16 illustrates an example block processing pipeline of an example H.264 video encoder, and FIG. 17 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Neighbor Context Processing in Block Processing Pipelines

Figure 9:
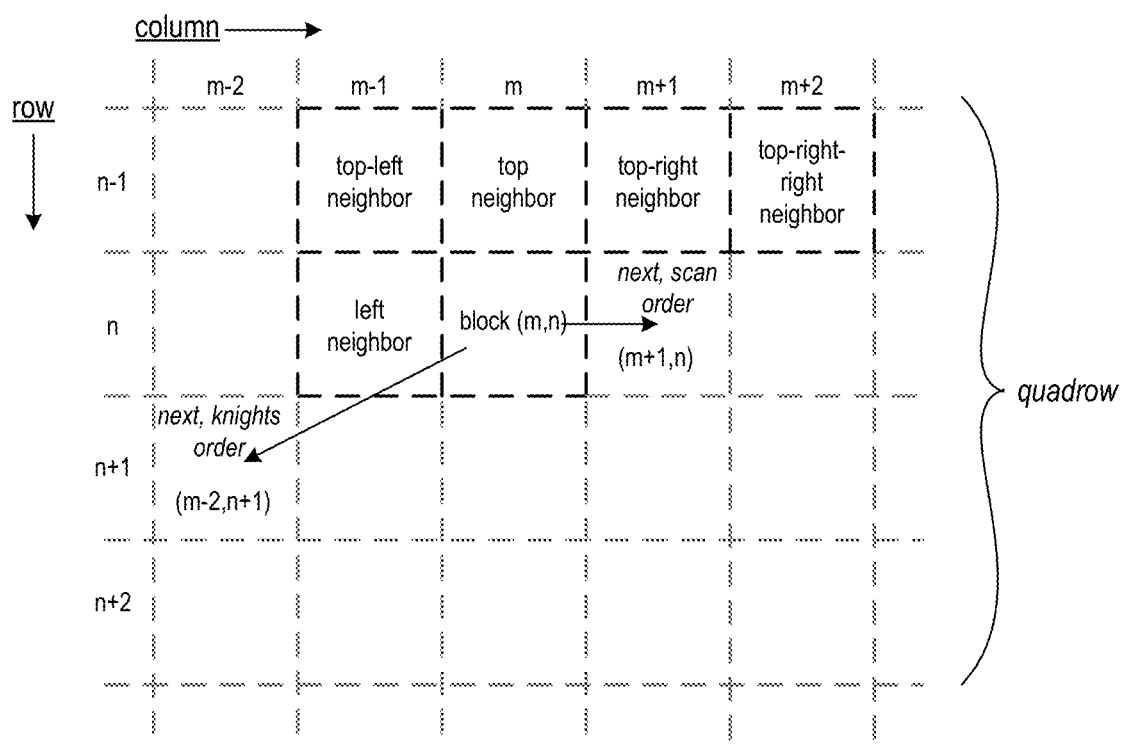
FIG. 9 shows neighbor blocks of a current block in a frame, and further illustrates a knight's order processing method for the blocks, according to at least some embodiments.

Embodiments of block processing pipeline methods and apparatus are described in which at least one stage of a block processing pipeline processes blocks of pixels from a frame according to neighbor pixels from one or more previously processed neighbor blocks of the frame. One of the neighbor blocks may be the left neighbor block as shown in FIG. 9. Blocks from the frame are input to the pipeline so that adjacent blocks on a row are not concurrently at adjacent stages of the pipeline. For example, in at least some embodiments, blocks may be input to and processed in the pipeline according to knight's order, for example as described in the section titled Knight's order processing. In at least some embodiments, blocks of pixels from the frame are input and processed according to groups of two or more rows (e.g., in row groups each containing four rows of blocks). For example, the section titled Knight's order processing describes using row group constraints with knight's order input. As an example, using knight's order processing with a quadrow (four row) constraint provides four stages of space between the current block at a stage and its left neighbor block. In other words, when the current block is at a stage that needs the block's left neighbor data to process the block, the left neighbor will be four stages downstream from the stage. Note, however, that other block input and processing orders that provide one or more stages of space between adjacent blocks from a row in the pipeline may be used in some embodiments.

A block processing method such as knight's order that provides one or more stages (e.g., four stages) of spacing between adjacent blocks in the pipeline provides latency (e.g., four pipeline cycles) for processing the left neighbor block of a block at downstream stage(s) of the pipeline so that processed pixels from the left neighbor block can be made available at an upstream stage of the pipeline to process the block to the immediate right of the left neighbor block on a row. In contrast, when processing in scan order, the left neighbor block would only be at the next stage of the pipeline, and thus the previous stage that is processing the block to the right would either have to wait for the left neighbor block to be processed at one or more downstream stage(s) or process the block without the left neighbor data.

In at least some embodiments, the neighbor blocks used to process a current block at a stage may also include one or more previously processed above neighbor blocks from the row above the current block, for example the left top and top neighbors as shown in FIG. 9. In at least some embodiments, the above neighbor data may be passed to the stage from an upstream stage of the pipeline. In at least some embodiments, a stage at or near the end of the pipeline may cache processed blocks from a row to a row structure in a memory, and a stage at or near the beginning of the pipeline may read the above neighbor block data from the memory and pass the above neighbor block data to the stage with the respective block. Alternatively, in some embodiments, the stage may access the above neighbor data directly from the memory. Example methods for providing above neighbor data to a stage that may be used in at least some embodiments are described in the section titled Caching neighbor data.

Figure 3A:
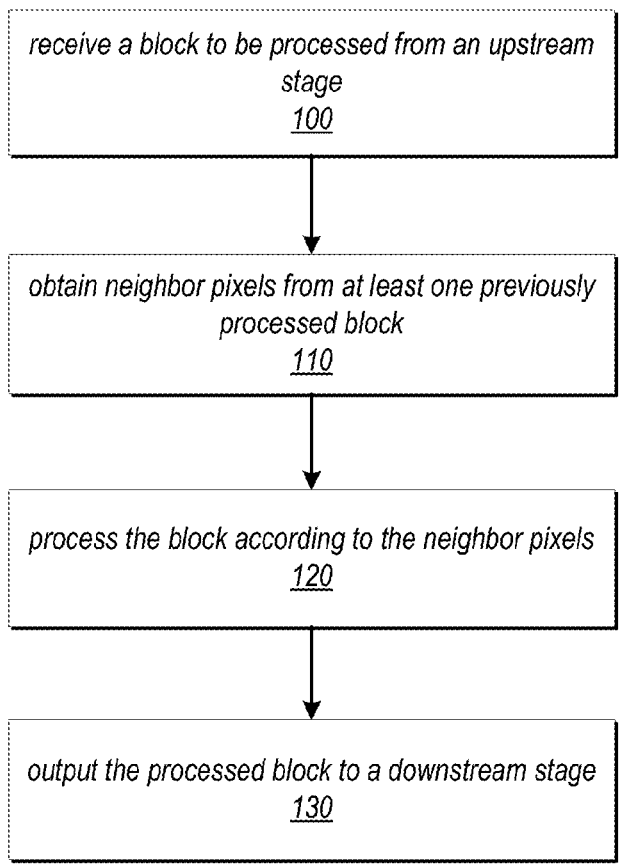
FIGS. 3A and 3B are high-level flowcharts of a method for processing blocks at a stage of a pipeline using neighbor block data, according to at least some embodiments.
Figure 3B:
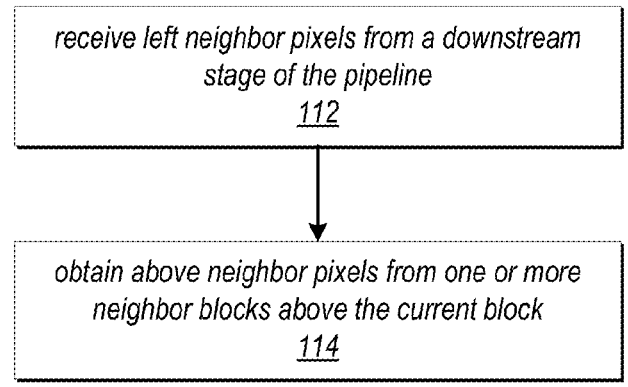

FIGS. 3A and 3B are high-level flowcharts of a method for processing blocks at a stage of a pipeline using neighbor block data, according to at least some embodiments. The methods of FIGS. 3A and 3B may, for example, be implemented by a stage at element 3106 of FIG. 11A, or by a stage at element 4204 of FIG. 14, or by a stage in the example block processing method shown in FIG. 16.

Figure 4A:
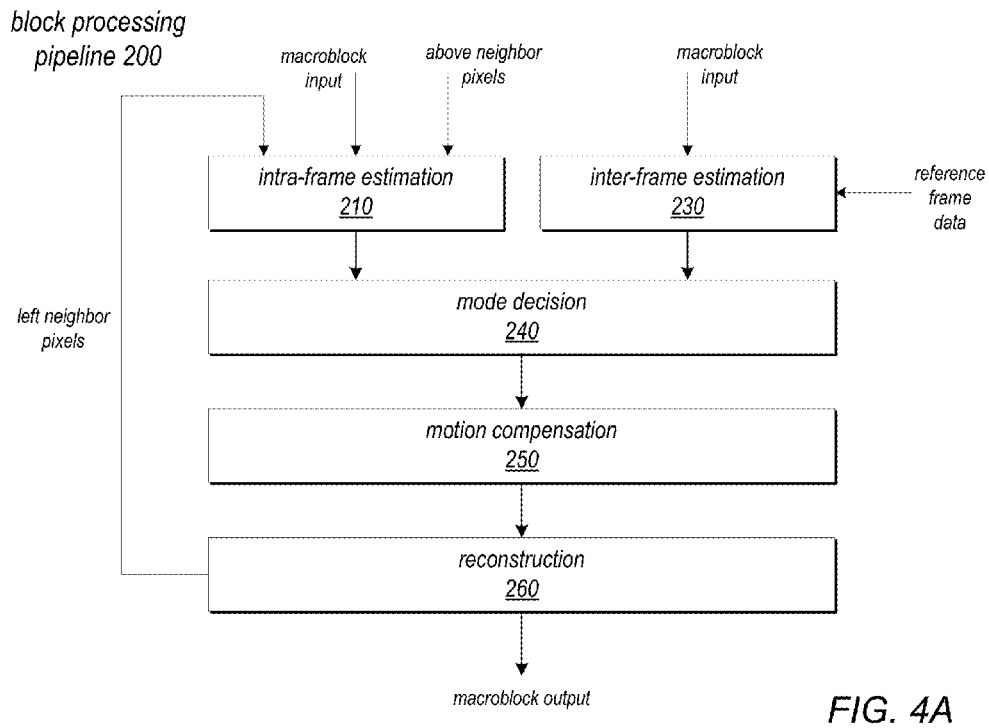
FIG. 4A is a block diagram of an example pipeline in which an intra-frame estimation stage processes macroblocks using neighbor macroblock data, according to at least some embodiments.
Figure 4B:
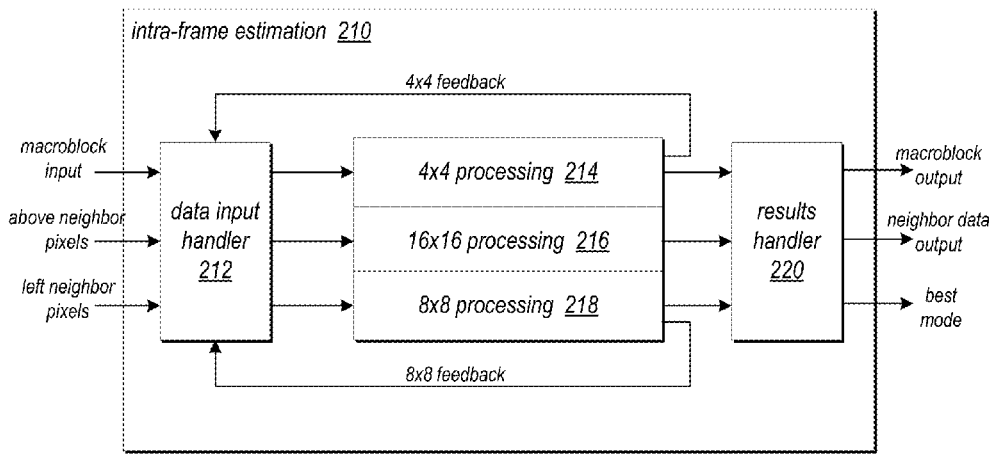
FIG. 4B is a block diagram of an example intra-frame estimation component that may be implemented at a stage of a block processing pipeline, according to at least some embodiments.

FIG. 3A is a high-level flowchart of a method for processing blocks at a stage of a pipeline using neighbor block data, according to at least some embodiments. As indicated at 110, the stage may receive a block to be processed from an upstream stage of the pipeline. As indicated at 110, the stage may also obtain neighbor pixels from at least one previously processed block. Element 110 is expanded on in FIG. 3B. As indicated at 120, the stage may process the block according to the obtained neighbor pixels. An example block processing method that may be performed at the stage is intra-frame estimation, for example as illustrated in FIGS. 4A and 4B. As indicated at 130, the stage may output at least the processed block to a downstream stage of the pipeline.

FIG. 3B is a high-level flowchart of a method for obtaining neighbor block data that may be used at element 110 of FIG. 3A, according to at least some embodiments. As indicated at 112, the stage may receive left neighbor pixels from a downstream stage of the pipeline. In at least some embodiments, the left neighbor block's processed pixels may be received from a downstream stage of the pipeline that has processed or is currently processing the left neighbor block. In at least some embodiments, assuming r as the number of rows in a row group, then the downstream stage from which the left neighbor pixels are received may be r−1 stages downstream from the stage. For example, referring to FIG. 4A, assuming r=4, and assuming intra-frame estimation 210 needs left neighbor pixels for a macroblock currently at the stage, the left neighbor macroblock is currently at reconstruction 260 (three stages downstream from intra-frame estimation 210), and thus reconstruction 260 may feed back the processed (reconstructed) left neighbor pixels to intra-frame estimation 210.

Figure 10A:
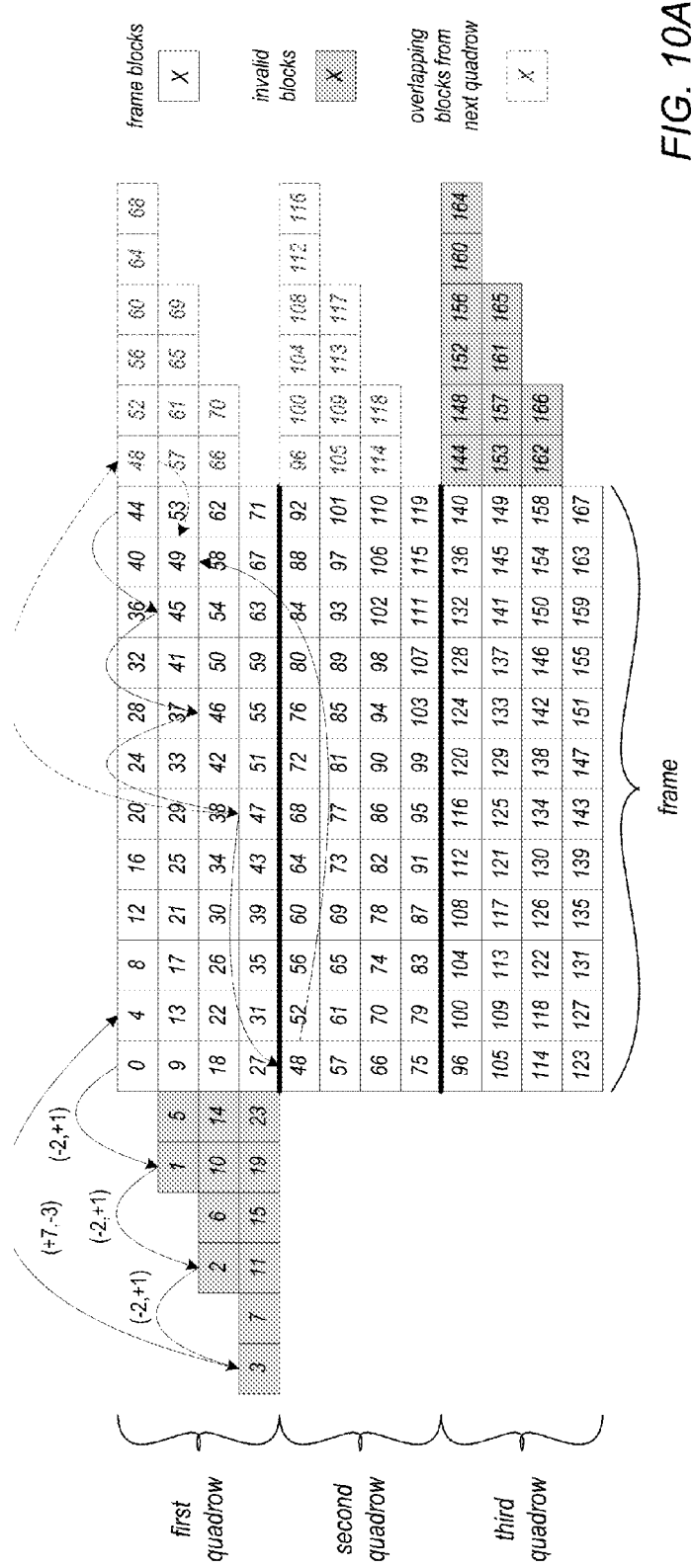
FIGS. 10A and 10B graphically illustrate the knight's order processing method including the algorithm for determining a next block, according to at least some embodiments.
Figure 10B:
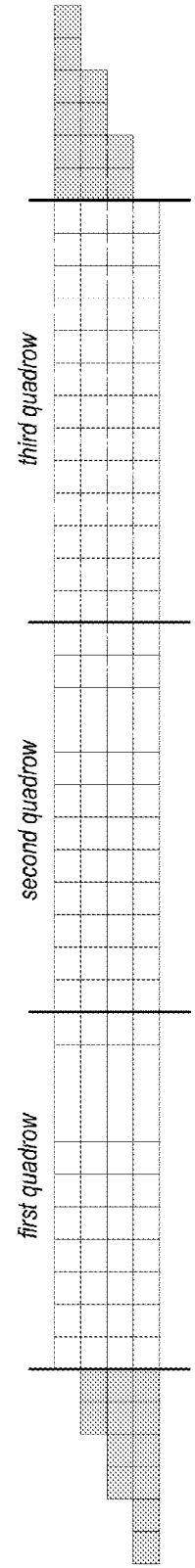

Note that, for some blocks, valid left neighbor pixels may not exist. For example, in some block processing pipeline implementations, valid left neighbor pixels may not exist for the blocks in the leftmost column of the frame. However, in some block processing pipeline implementations, for example as shown in FIGS. 10A and 10B, valid left neighbor pixels may not exist only for the blocks in the leftmost column of the first row group in the frame, as the row groups are overlapped when inputting and processing the blocks. Blocks for which valid left neighbor pixels do not exist may be processed at the stage without using left neighbor data.

As indicated at 114 of FIG. 3B, in at least some embodiments, above neighbor pixels may be obtained from one or more neighbor blocks on the row above the current block. For example, in at least some embodiments, pixels from the left top and/or top neighbors as shown in FIG. 9 may be obtained. In at least some embodiments, the above neighbor pixels may be passed to the stage from an upstream stage of the pipeline. In at least some embodiments, a stage at or near the end of the pipeline may cache processed blocks from a row to a row structure in a memory, and a stage at or near the beginning of the pipeline may read the above neighbor block data from the memory and pass the above neighbor block data to the stage with the respective block. Alternatively, in some embodiments, the stage may access the above neighbor data directly from the memory. Example methods for obtaining above neighbor data at a stage that may be used in at least some embodiments are described in the section titled Caching neighbor data.

Note that, for some blocks, valid above neighbor pixels may not exist. For example, in at least some block processing pipeline implementations, valid above neighbor pixels may not exist for the blocks on the top row of the frame. Blocks for which valid above neighbor pixels do not exist may be processed at the stage without using above neighbor data.

Intra-Frame Estimation in Block Processing Pipelines

An example block processing method that may use neighbor pixels from one or more neighbor blocks is intra-frame estimation. FIGS. 4A and 4B illustrate example intra-frame estimation methods and apparatus that may be used in a block processing pipeline. Embodiments of an example block processing method for H.264 encoding that may implement intra-frame estimation methods and apparatus as described herein at a stage of the pipeline are described in the section titled Example block processing pipeline. However, embodiments of the intra-frame estimation methods and apparatus may be used in encoders for other video encoding formats, for example in block processing pipelines of HEVC (High Efficiency Video Encoding) video encoders.

Embodiments of the intra-frame estimation methods and apparatus are generally described in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. For example, in at least some embodiments, the intra-frame estimation 210 component of a pipeline as shown in FIG. 4A may operate only on luma blocks from a macroblock, with intra-frame estimation being performed for the chroma portion of the macroblock at a later stage of the pipeline.

FIG. 4A is a block diagram of an example block processing pipeline 200 in which an intra-frame estimation component 210 at a stage processes macroblocks using neighbor block data, according to at least some embodiments. Note that the pipeline 200 and its components may be implemented in hardware, software, or a combination thereof. Pipeline 200 may include at least intra-frame estimation 210 and inter-frame estimation 230 components, a mode decision 240 component, a motion compensation 250 component, and a reconstruction 260 component.

Intra-frame estimation 210 and inter-frame estimation 230 components of pipeline 200 may determine blocks of previously encoded pixels to be used in encoding macroblocks input to the pipeline 200. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or as motion estimation. Intra-frame estimation 210 and inter-frame estimation 230 operations may be subdivided into two or more sub-operations that may be performed at one, two, or more stages of the pipeline 200, with one or more components at each stage configured to perform a particular sub-operation. In the example pipeline 200 of FIG. 4A, intra-frame estimation is performed by an intra-frame estimation 210 component at a stage of the pipeline 200.

Inter-frame estimation 230 is further described in the section titled Motion estimation later in this document. Mode decision 240 is further described in the section titled Mode decision later in this document. Motion compensation 250 and reconstruction 260 are further described in the section titled Motion compensation and reconstruction later in this document. In at least some embodiments, intra-frame estimation 210, inter-frame estimation 230, mode decision 240, motion compensation 250, and reconstruction 260 as shown in FIG. 4A are performed on luma for each macroblock, with chroma motion compensation and reconstruction performed at one or more subsequent stages after luma reconstruction 260. Luma-specific motion compensation and reconstruction are further described in the section titled Luma motion compensation and reconstruction later in this document.

In at least some embodiments, intra-frame estimation 210 component of the pipeline 200 performs intra mode selection to determine blocks of pixels already encoded within the current frame that may be used in encoding a macroblock currently at the stage. In at least some embodiments, intra-frame estimation 210 performs intra mode selection only for luma. In these embodiments, chroma intra estimation is performed at a downstream stage of the pipeline 200, for example at a chroma reconstruction stage (not shown in FIG. 4A).

In at least some embodiments, intra-frame estimation 210 receives a current macroblock to be processed from an upstream stage of the pipeline 200. In addition, in at least some embodiments, an upstream stage of pipeline 200 obtains above neighbor pixels from one or more previously processed macroblocks on the row above the current macroblock from memory and passes the above neighbor pixels to intra-frame estimation 210. In at least some embodiments, a downstream stage (e.g., a reconstruction 260 stage, three stages downstream from intra-frame estimation 210) may pass processed (reconstructed) left neighbor pixels back to intra-frame estimation 210.

In at least some embodiments, intra-frame estimation 210 may perform intra estimation independently for each of two or more sub-blocks or partitions (e.g., 4×4, 8×8, and 16×16 blocks) in a macroblock. For each sub-block, prediction pixels are first extracted from neighbor sub-blocks (neighbor sub-blocks can be from neighbor macroblocks outside the current macroblock in the frame or within the current macroblock). For each prediction mode in the current sub-block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future sub-blocks within the macroblock. A best mode is determined for each sub-block size that is processed (e.g., 4×4, 8×8, and 16×16 sub-blocks), and a best intra mode may be determined from among the best modes according to cost. Intra-frame estimation 210 may pass the best intra mode information to mode decision 240 along with the current macroblock and neighbor information.

FIG. 4B is a block diagram of an example intra-frame estimation component that may be implemented at a stage of a block processing pipeline, for example pipeline 200 of FIG. 4A, according to at least some embodiments. An intra-frame estimation 210 component may perform intra mode selection to determine blocks of pixels already encoded within the current frame that may be used in encoding a macroblock currently at the stage. In at least some embodiments, intra-frame estimation 210 performs intra mode selection only for luma. Intra-frame estimation 210 component may include at least a data input handler 212, a results handler 220, and separate internal sub-block processing pipelines for each sub-block format to be processed, in this example 4×4 processing 214, 8×8 processing 218, and 16×16 processing 216. Intra-frame estimation 210 component and its sub-components may be implemented in hardware, software, or a combination thereof.

In at least some embodiments, data input handler 212 component of intra-frame estimation 210 receives a current macroblock to be processed from an upstream stage of the pipeline 200. In at least some embodiments, data input handler 212 receives processed (reconstructed) left neighbor pixels from a downstream stage (e.g., a reconstruction 260 stage, three stages downstream from intra-frame estimation 210). In addition, in at least some embodiments, data input handler 212 receives above neighbor pixels from one or more previously processed macroblocks on the row above the current macroblock from an upstream stage of the pipeline. Data input handler 212 manages input of sub-blocks from the current macroblock and of neighbor pixels to each of the 4×4 processing 214, 8×8 processing 218, and 16×16 processing 216 pipelines. In addition, in at least some embodiments, data input handler 212 may receive feedback pixels from reconstructed sub-blocks from the 4×4 processing 214 and 8×8 processing 218 pipelines for use in predicting other sub-blocks in the sub-block processing pipelines.

In at least some embodiments, a best mode is determined for each sub-block size that is processed (e.g., 4×4, 8×8, and 16×16 sub-blocks) in the sub-block processing pipelines. For each sub-block input to the 4×4 processing 214, 8×8 processing 218, and 16×16 processing 216 pipelines, prediction pixels are first extracted from neighbor sub-blocks (neighbor sub-blocks can be from above or left neighbor macroblocks in the frame or from within the current macroblock). In each sub-block processing pipeline, for each prediction mode of the sub-block format, the cost of the current prediction mode is evaluated by creating a prediction block from neighbor pixels, computing a mode cost, and comparing the mode cost to a minimum cost for that block. In at least the 4×4 processing 214 and 8×8 processing 218 pipelines, once all prediction modes are evaluated and the best mode is determined, reconstruction of the current sub-block may be performed according to the best mode so that reconstructed pixels can be used to predict future sub-blocks within the macroblock by feeding the reconstructed pixels back to data input handler 212. Results of all three sub-block processing pipelines are passed to results handler 220, and a best intra mode may be determined from among the best modes according to cost. Results handler 220 may pass the best intra mode information to mode decision 240 along with the current macroblock and neighbor information.

Figure 5A:
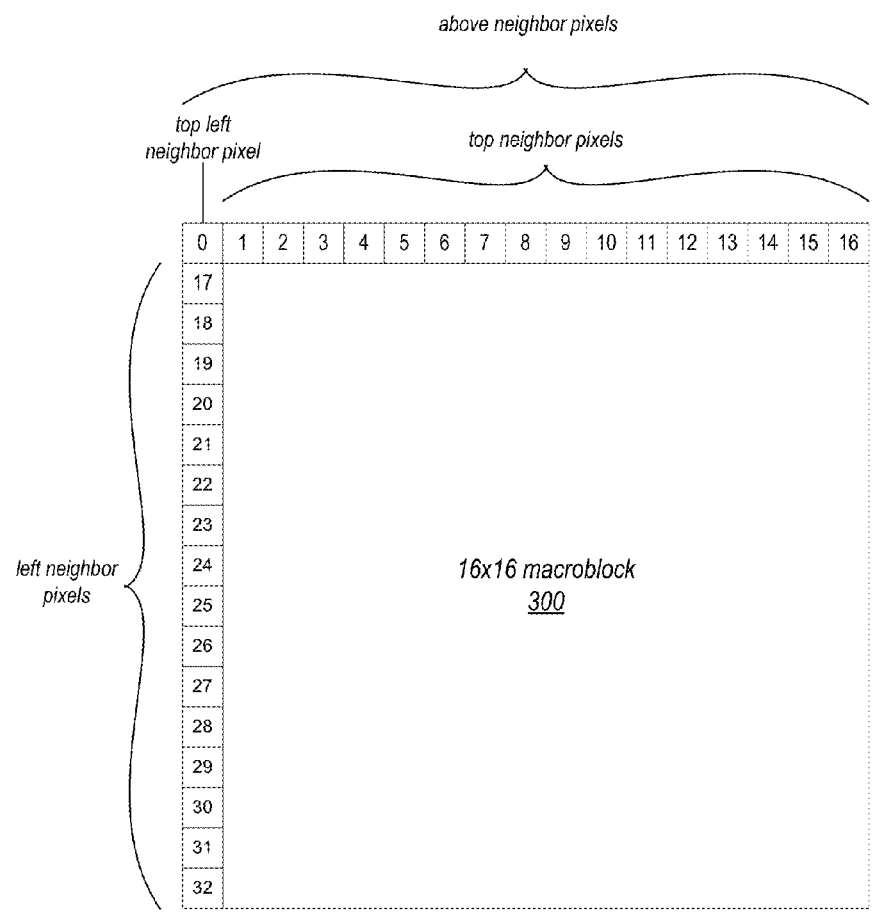
FIGS. 5A and 5B graphically illustrate 16×16 block processing at an example intra-frame estimation stage, according to at least some embodiments.
Figure 5B:
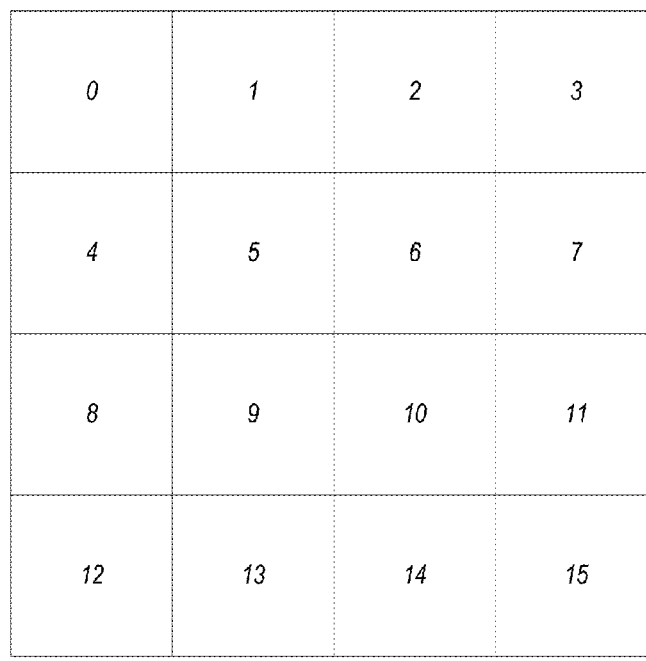

FIGS. 5A and 5B graphically illustrate 16×16 block processing at an example intra-frame estimation stage, according to at least some embodiments. FIG. 5A graphically illustrates neighbor pixels used in processing 16×16 blocks, according to at least some embodiments. Referring to the intra-frame estimation 210 component of FIG. 4B, the 16×16 processing pipeline 216 receives the current 16×16 block 300 and neighbor data (left neighbor pixels, upper left neighbor pixel(s), and top neighbor pixels), performs intra prediction on the entire block 300, and produces "best mode" information and cost for the entire macroblock.

FIG. 5B graphically illustrates subdividing the 16×16 block into sub-blocks for processing in the 16×16 processing pipeline 216, according to at least some embodiments. In at least some embodiments, the 16×16 block may be broken up into sub-blocks (e.g., 4×4 sub-blocks) that can be processed independently in the 16×16 block processing pipeline 216. Since none of the sub-blocks depend on each other, the sub-blocks may be processed in a simple scan order from sub-block 0 to sub-block 15, as shown in FIG. 5B, or more generally in any order.

Figure 6A:
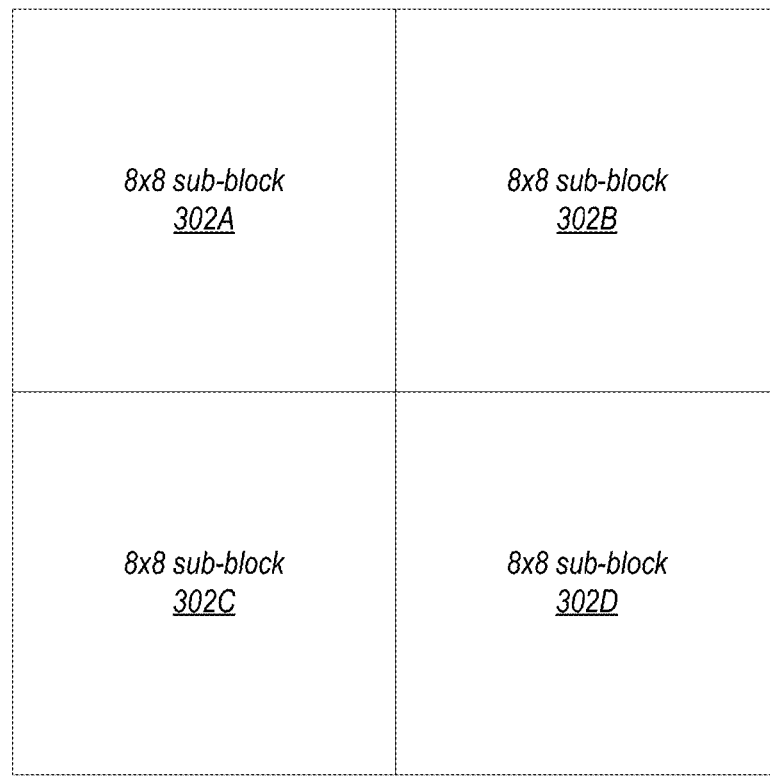
FIGS. 6A and 6B graphically illustrate 8×8 sub-block processing at an example intra-frame estimation stage, according to at least some embodiments.
Figure 6B:
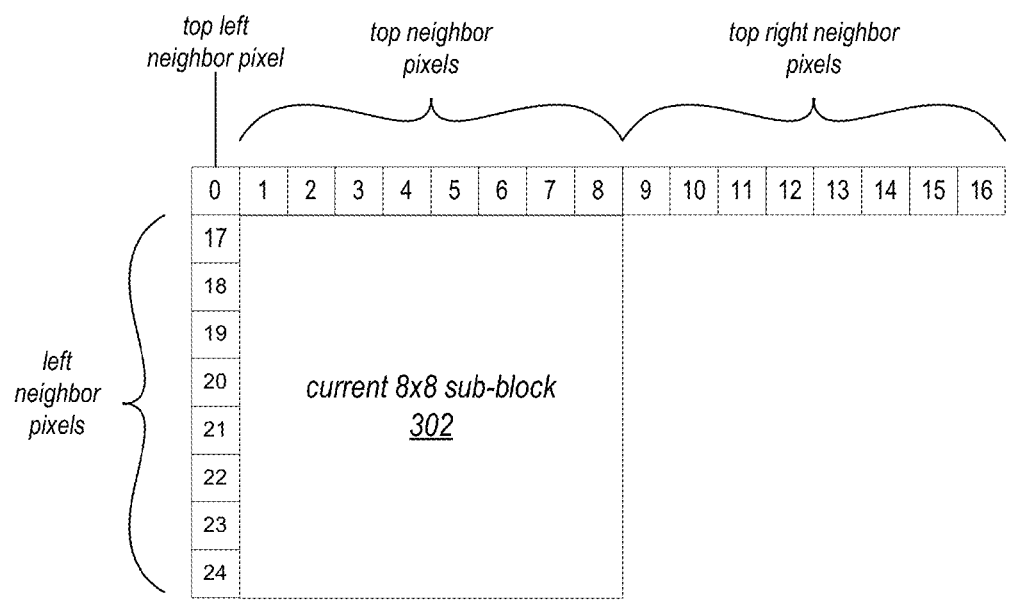

FIGS. 6A and 6B graphically illustrate 8×8 sub-block processing at an example intra-frame estimation stage, according to at least some embodiments. Referring to the intra-frame estimation 210 component of FIG. 4B, the 8×8 processing pipeline 218 receives the source macroblock and neighbor data (left neighbor pixels, upper left neighbor pixel(s), top neighbor pixels, and top right neighbor pixels), performs intra prediction on each of the four 8×8 sub-blocks 302, and produces "best mode" information and cost for the entire macroblock. FIG. 6A graphically illustrates the four 8×8 sub-blocks 302 of a macroblock that are input to the 8×8 processing pipeline 218, according to at least some embodiments. In at least some embodiments, the four sub-blocks 302 may be input to the pipeline 218 in scan order (302A, 302B, 302C, 302D), although other input orders may be used. FIG. 6B graphically illustrates the left neighbor, upper left neighbor, top neighbor, and top right neighbor pixels used for each 8×8 sub-block 302, according to at least some embodiments.

Figures 7A, 7B:
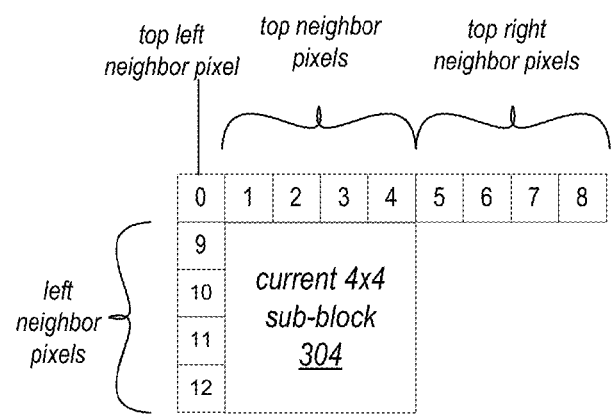
FIGS. 7A and 7B graphically illustrate 4×4 sub-block processing at an example intra-frame estimation stage, according to at least some embodiments.

FIGS. 7A and 7B graphically illustrate 4×4 sub-block processing at an example intra-frame estimation stage, according to at least some embodiments. Referring to the intra-frame estimation 210 component of FIG. 4B, the 4×4 processing pipeline 214 receives the source macroblock and neighbor data (left neighbor pixels, upper left neighbor pixel(s), top neighbor pixels, and top right neighbor pixels), performs intra prediction on each of the sixteen 4×4 sub-blocks 304, and produces "best mode" information and cost for the entire macroblock. FIG. 7A graphically illustrates the sixteen 4×4 sub-blocks 304 of a macroblock that are input to the 4×4 processing pipeline 214, according to at least some embodiments. FIG. 7B graphically illustrates the left neighbor, upper left neighbor, top neighbor, and top right neighbor pixels used for each 4×4 sub-block 304, according to at least some embodiments.

In some embodiments, the sixteen sub-blocks 304 may be input to the 4×4 processing pipeline 214 in scan order from 304A through 304P as shown in FIG. 7A. However, other input orders may be used. For example, FIG. 8A illustrates a input order for the sixteen 4×4 sub-blocks 304 that make up a macroblock in which the sub-blocks are input in order from sub-block 0 to sub-block 15. However, for the purposes of intra prediction, each 4×4 sub-block 304 is dependent on its left, top-left, top, and top-right neighbor sub-blocks for neighbor pixel data. By processing the 4×4 sub-blocks 304 in either scan order or in the order shown in FIG. 8A, the pipeline 314 would almost always need to wait for a current sub-block 304 to fully complete processing before the neighbor pixels needed to start on a next sub-block 304 are available.

FIG. 8B graphically illustrates an input method for 4×4 sub-block processing that may reduce the need to wait on neighbor sub-blocks, according to at least some embodiments. To reduce the need to wait for the previous sub-block 304 to complete and thus make more efficient use of the 4×4 processing pipeline 314, the 4×4 sub-blocks 304 may be processed in a modified "knight's order", for example as shown in FIG. 8B. Using the input order from sub-block 0 to sub-block 15 as shown in FIG. 8B, sub-block 5 is not dependent on sub-block 4 and so can be dispatched before sub-block 4 fully completes. Sub-block 6 will still have to wait for sub-block 5 to complete before it can start, but sub-block 7 is not dependent on sub-block 6 and so can be dispatched before sub-block 6 fully completes.

While the intra-frame estimation methods and apparatus illustrated in FIGS. 4A through 8B are directed to processing 16×16 pixel macroblocks as used, for example, in H.264 encoding, embodiments may be adapted for use in pipelines in which blocks of other sizes are processed. For example, HEVC encoding uses blocks referred to as Coding Tree Units (CTUs) that may vary within the range of 16×16 pixel to 64×64 pixel. Adapting the methods and apparatus for use with, for example, 32×32 or 64×64 pixel CTUs may, for example, include increasing the number of left and above neighbor pixels per processed block (CTU) and adding one or more additional sub-block processing pipelines to intra-frame estimation 210 component as illustrated in FIG. 4B to handle processing of additional sub-block sizes. Also note that the input method for 4×4 sub-block processing shown in FIG. 8B may be applied in processing 4×4 sub-blocks from larger blocks of pixels, for example 32×32 or 64×64 pixel CTUs as used in HEVC encoding. In addition, the input method as shown in FIG. 8B may also be applied in sub-block processing pipelines that process larger sub-block sizes, for example 8×8 sub-blocks.

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 9 shows neighbors of a current block (m,n) from which information may be required—left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 9, information from the left neighbor of block (m,n) may be required to perform a particular operation on the block. In the knight's order processing method, rather than inputting block (m+1, n) into the pipeline immediately after block (m,n), the next block input to the pipeline is block (m−2,n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 9, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 9. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

---

If not on the bottom row of a quadrow:
    The next block is two columns left, one row down (−2,+1).
Otherwise, at the bottom row of a quadrow:
    The next block is seven columns right, three rows up (+7,−3).

---

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

---

If not on the bottom row of a row group:
    The next block is p columns left, one row down (−p,+1).
Otherwise, at the bottom row of a row group:
    The next block is q columns right, (r−1) rows up (+q,−(r−1)).

---

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

FIGS. 10A and 10B graphically illustrate the knight's order processing method, according to at least some embodiments. For simplicity, these Figures use an example 192×192 pixel frame divided into 144 16×16 pixel blocks, with 12 rows and 12 columns of blocks. However, it is to be noted that the knight's order processing method can be applied to input video frames of any dimensions. In FIG. 10A, an example frame is divided into rows and columns of blocks. The rows of blocks are partitioned into three quadrows including four rows each. The last three rows of the first quadrow are padded on the left with invalid blocks, and the first three rows of the last (third) quadrow are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 10A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 10A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows as if they were arranged end to end, with invalid blocks at each end, as shown in FIG. 10B. Thus, the algorithm for determining a next block remains the same across the entire frame.

In some embodiments, each row of the first quadrow may be padded with extra invalid blocks, for example with two extra invalid blocks. Instead of beginning with the first block in the top row of the first quadrow as shown in FIG. 10A, input to the pipeline may begin with the first invalid block to the left of the first block in top row of the first quadrow.

Figure 11A:
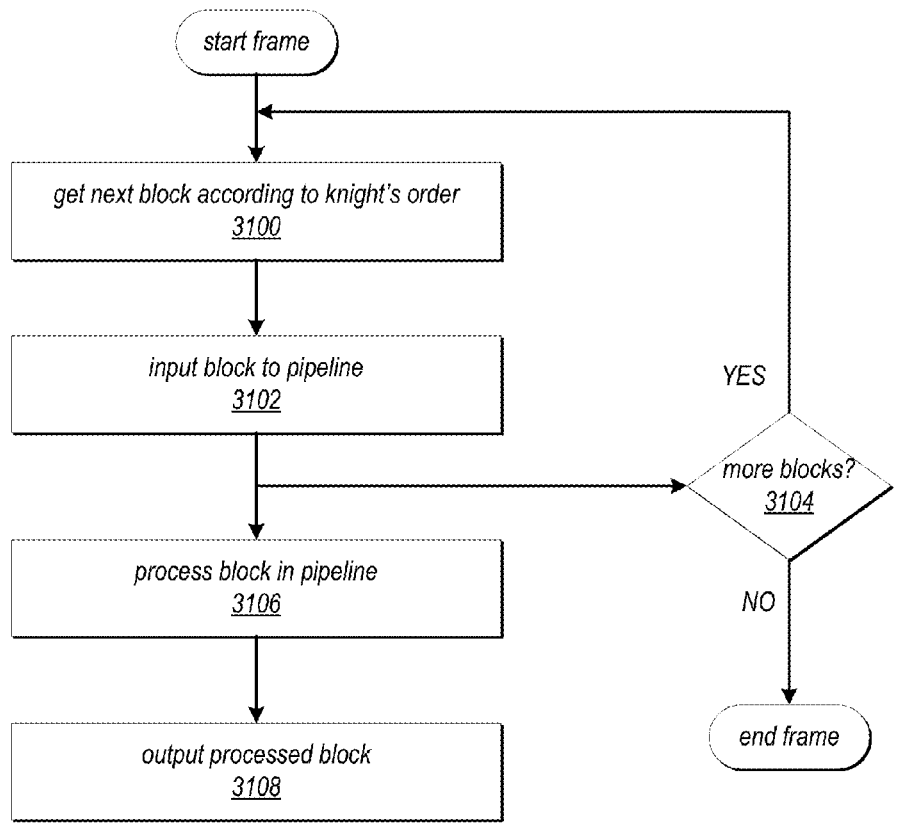
FIGS. 11A and 11B are high-level flowcharts of a knight's order processing method for a block processing pipeline, according to at least some embodiments.
Figure 11B:
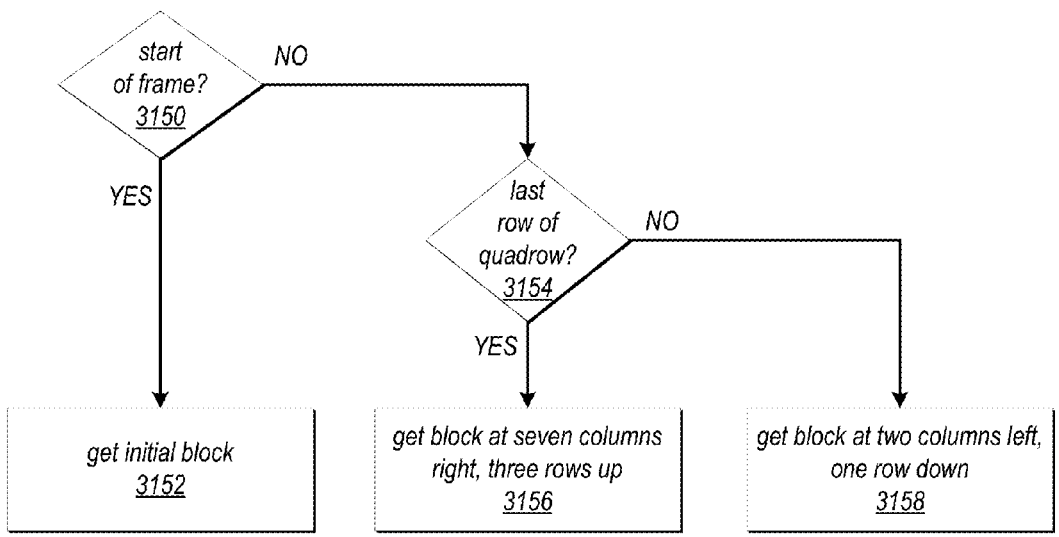

FIGS. 11A and 11B are high-level flowcharts of a knight's order processing method for a block processing pipeline, according to at least some embodiments. In FIG. 11A, as indicated at 3100, a next block is determined according to the algorithm for determining a next input block that is implemented by the knight's order processing method. As indicated at 3102, the block is input to the pipeline, for example from a memory via direct memory access (DMA). As shown by 3104, the input process of elements 3100 and 3102 continues as long as there are blocks to be processed. Each block that is input to the pipeline by elements 3100 and 3102 is processed in the pipeline, as indicated at 3106. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 3108, once a block has been processed by a last stage of the pipeline, the processed block is output, for example to a memory via direct memory access (DMA).

FIG. 11B is a flowchart of an example algorithm for determining a next input block that may be implemented by the knight's order processing method, and expands on element 3100 of FIG. 11A. FIG. 11B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 3150, if at the start of the frame, the method gets an initial block as indicated at 3152. If this is not the start of the frame, then at 3154, if this is the last row of the quadrow, the next block is seven columns right, three rows up, as indicated at 3156. If this is not the last row of the quadrow, the next block is two columns left, one row down, as indicated at 3158.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 9. The knight's order processing method with quadrow constraints provides locality of neighbor information that may be leveraged to provide local caching of neighbor data at each stage of the pipeline in relatively small local buffers. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

In at least some embodiments of a block processing pipeline that implements the knight's order processing method, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 12:
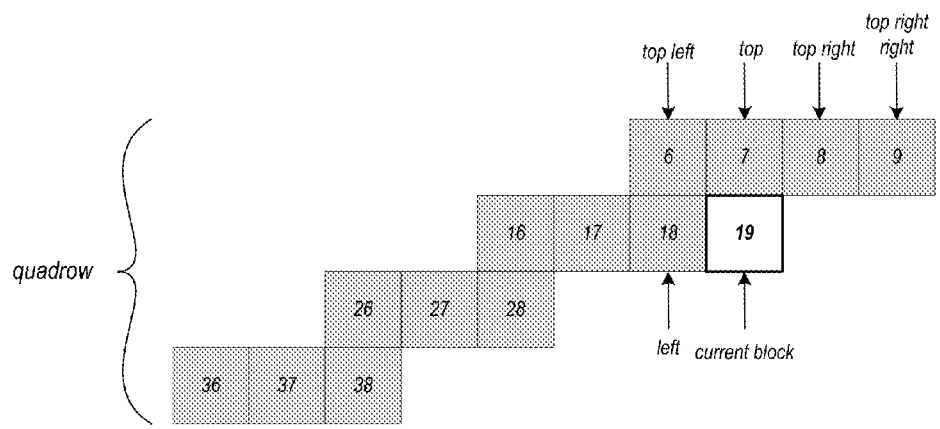
FIG. 12 shows a portion of a quadrow as processed in a pipeline according to the knight's order processing method that may be cached in the current quadrow buffer, according to at least some embodiments.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. FIG. 12 shows a portion of a quadrow as processed in a pipeline according to the knight's order processing method that may be cached in the current quadrow buffer, according to at least some embodiments. Block 19 represents a current block at a stage. The shaded blocks represent the 13 most recently processed blocks by the stage. Note that the farthest block from block 19 in time is its top-left neighbor (block 6), and the nearest block in time is its top-right-right neighbor (block 9).

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow. To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The number of entries in the previous quadrow buffer, as well as the particular neighbor blocks that are cached in the previous quadrow buffer, may be dependent on the requirements of the particular block processing method that is implemented by the block processing pipeline. In at least some embodiments, when processing a quadrow according to the knight's order processing method, information for each block on the bottom row of the quadrow may be written to an external memory, for example when the block is at a last stage of the pipeline. For each block in the top row of a quadrow, neighbor (e.g., top-right-right neighbor) data may be read from the external memory, for example at a first stage of the pipeline. This neighbor information may be passed down the pipeline to the other stages along with the corresponding block from the top row.

Figure 13:
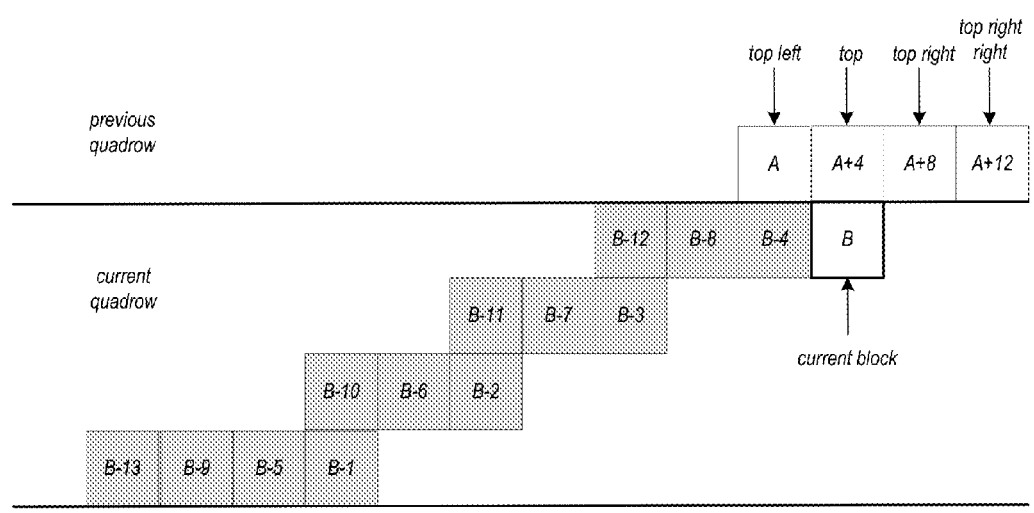
FIG. 13 graphically illustrates blocks in a current quadrow being processed according to the knight's order processing method, as well as neighbor blocks in the last row of the previous quadrow that may be cached in a previous quadrow buffer, according to at least some embodiments.

FIG. 13 graphically illustrates blocks in a current quadrow being processed according to the knight's order processing method, as well as neighbor blocks in the last row of the previous quadrow, according to at least some embodiments. Blocks A, A+4, A+8, and A+12 were processed on the previous quadrow according to the knight's order processing method. Block A was processed first, block A+4 was processed four cycles later, and so on. Block B represents a block on the current quadrow that is currently at a particular stage of the pipeline. Blocks B-1 (B minus 1) through B-13 (B minus 13) represent the thirteen blocks that were most recently processed at the stage in the current quadrow. Information from these blocks may be presently cached in the stage's current quadrow buffer, with B-1 as the most recent entry and B-13 as the oldest entry. B-4 is current block B's left neighbor. However, block B's top-left (block A), top (block A+4), top-right (block A+8), and top-right-right (block A+12) neighbors are on the bottom row of the previous quadrow, and are not included in the current quadrow buffer for block B. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Figure 14:
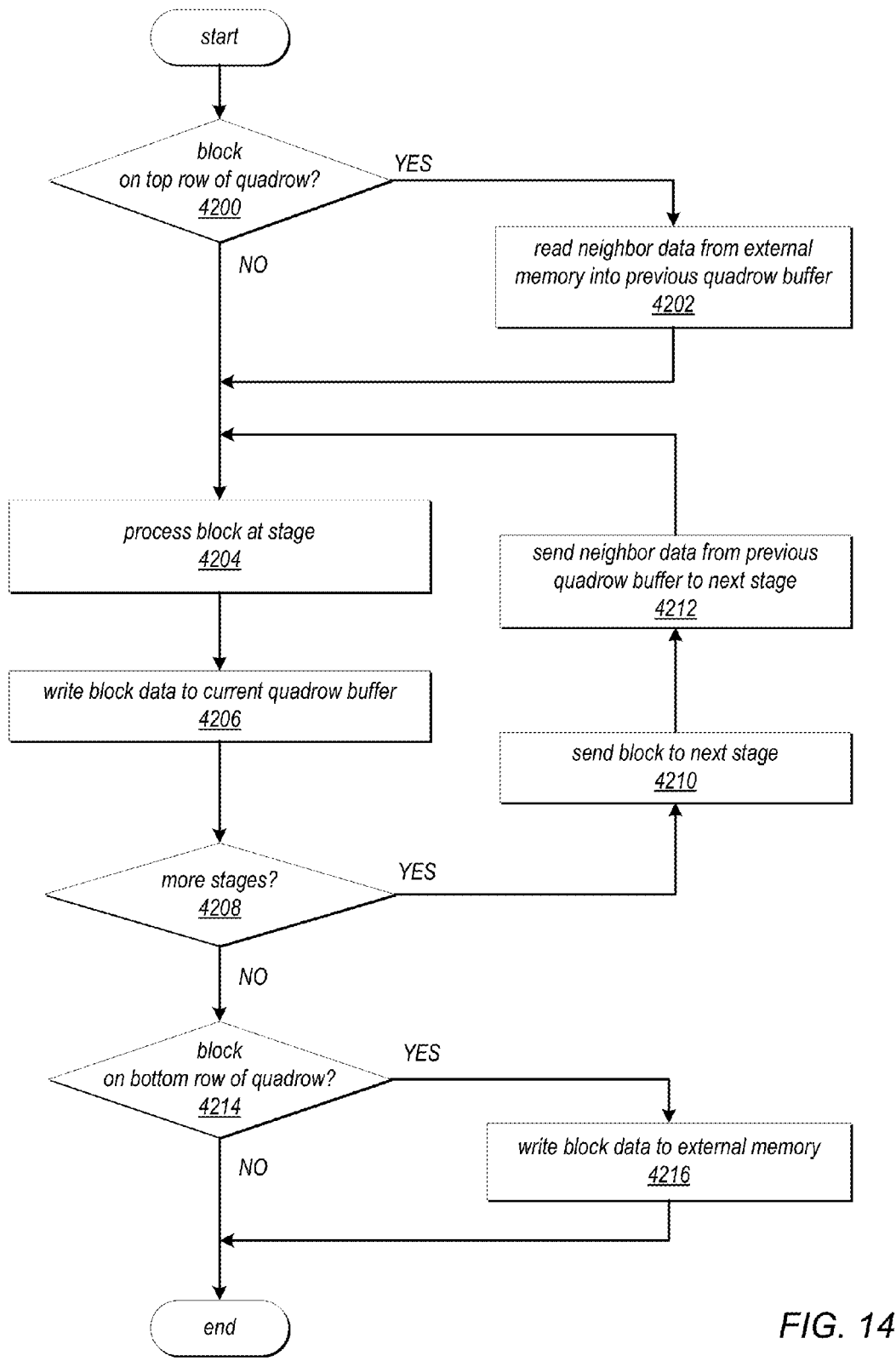
FIG. 14 is a flowchart of a method for processing blocks in a block processing pipeline in which neighbor data is cached in local buffers at the stages of the pipeline, according to at least some embodiments.

FIG. 14 is a flowchart of a method for processing blocks in a block processing pipeline in which neighbor data is cached in local buffers at the stages of the pipeline, according to at least some embodiments. For example, the method of FIG. 14 may be used at element 3106 of FIG. 11A to process blocks input to the pipeline according to the knight's order processing method as shown at elements 3100, 3102, and 3104 of FIG. 11A. In FIG. 14, a block is input to the pipeline. At 4200, at a first stage of the pipeline, if the block is on the top row of a quadrow, then neighbor data for the block may be read from external memory (for example, via DMA) into a previous quadrow buffer as indicated at 4202. In at least some embodiments, the neighbor data corresponds to the top-right-right neighbor of the current block on the bottom row of the previous quadrow. As indicated at 4204, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 4206, information about the current block may be written to the current quadrow buffer at the stage for use on subsequent blocks. The information may overwrite an oldest entry in the current quadrow buffer.

At 4208, if there are more stages, then the block may be sent to a next stage, as indicated at 4210. At 4212, neighbor information from the previous quadrow buffer may also be sent to the next stage. In at least some embodiments, this neighbor information is only sent to the next stage if the current block is on the top row of a quadrow. Elements 4204 through 4212 may be repeated until the block reaches and is processed by a last stage of the pipeline. At 4208, if there are no more stages, then processing of the block in the pipeline is done. At 4214, if the block is on the bottom row of a quadrow, then information for the block is written to an external memory (for example, via DMA) to be read as neighbor data for blocks in the top row of a next quadrow. In addition, all of the processed valid blocks are output as shown by element 3108 of FIG. 11A.

Example Pipeline Units

Figure 15A:
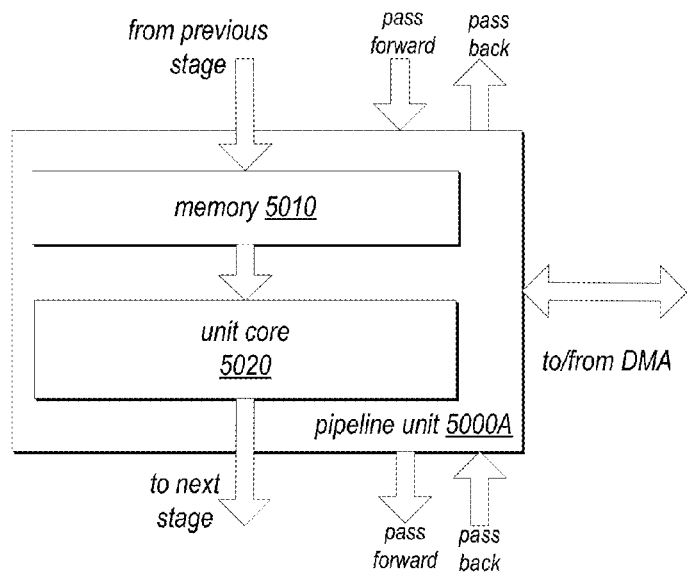
FIGS. 15A and 15B are block diagrams of example pipeline processing units that may be used at the stages of a block processing pipeline that implements one or more of the block processing methods and apparatus as described herein, according to at least some embodiments.
Figure 15B:
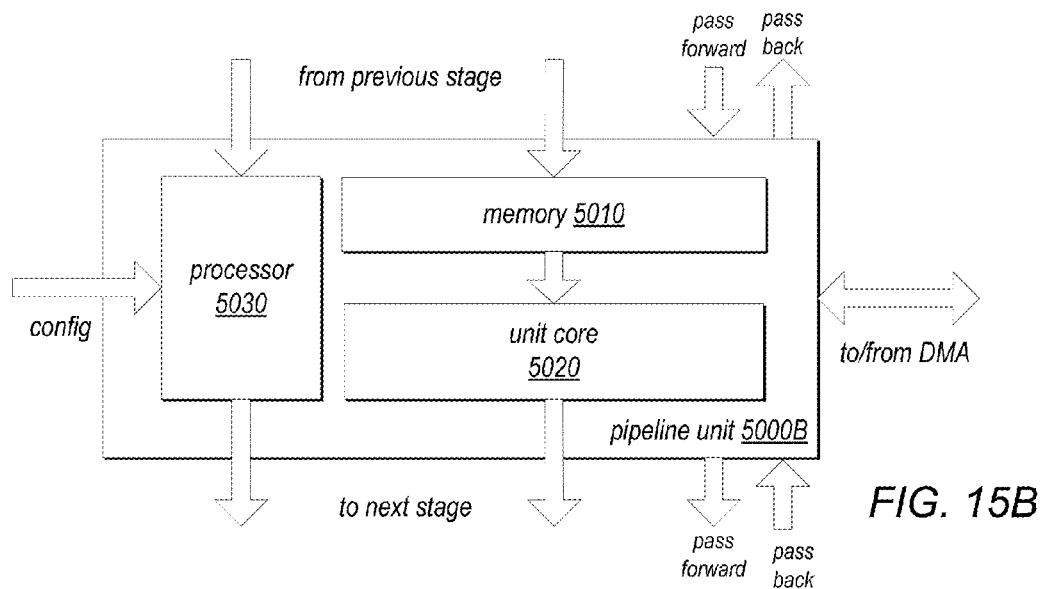
Figure 15C:
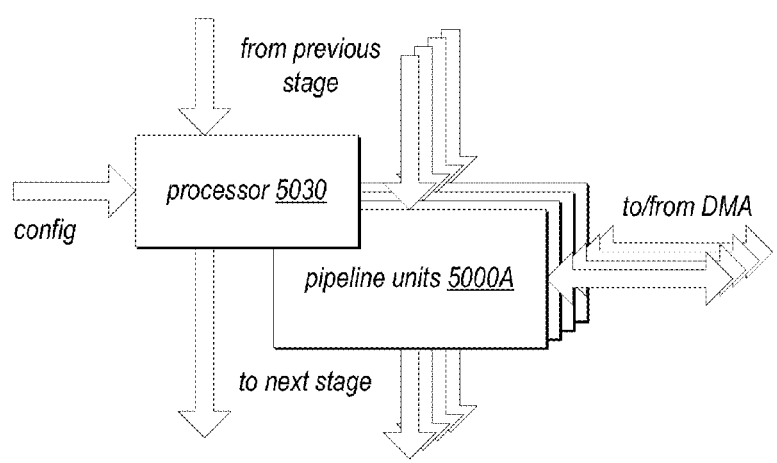
FIG. 15C shows that a single processor may be associated with a group of two or more pipeline units.

FIGS. 15A through 15C are block diagrams of example pipeline processing units that may be used at the stages of a block processing pipeline that implements one or more of the block processing methods and apparatus as described herein, according to at least some embodiments. For example, one or more of pipeline units 5000A and/or 5000B as shown in FIGS. 15A and 15B may be used at each stage of the example block processing pipeline shown in FIG. 16. Note that FIGS. 15A through 15C are not intended to be limiting; a pipeline processing unit may include more or fewer components and features than those shown in the Figures.

As shown in FIG. 15A, a pipeline unit 5000A may include at least a memory 5010 and a unit core 5020. Unit core 5020 may be a component (e.g., a circuit) that is configured to perform a particular operation on or for a block, or a portion of a block, at a particular stage of the block processing pipeline. Memory 5010 may, for example, be a double-buffered memory that allows the unit core 5020 to read and process data for a block from the memory 5010 while data for a next block is being written to the memory 5010 from a previous pipeline unit.

As shown in FIG. 15B, a pipeline unit 5000B, in addition to a memory 5010 and unit core 5020 as shown in FIG. 15A, may also include a processor 5030. Processor 5030 may, for example, be a mobile or M-class processor. The processors 5030 in pipeline units 5000B of a block processing pipeline may, for example, be used to control the block processing pipeline at block boundaries. The processors 5030 in pipeline units 5000B may be configurable, for example with low-level firmware microcode, to allow flexibility in algorithms that are implemented by the block processing pipeline for various applications. In at least some embodiments, a processor 5030 of a pipeline unit 5000B in the pipeline may be configured to receive data from a processor 5030 of a previous (upstream) pipeline unit 5000B and send data to a processor 5030 of a subsequent (downstream) pipeline unit 5000B. In addition, a processor 5030 of a pipeline unit 5000B at a last stage of the pipeline may be configured to send feedback data to a processor 5030 of a pipeline unit 5000B at a first stage of the pipeline.

As shown in FIGS. 15A and 15B, a pipeline unit 5000A or 5000B may be configured to access external memory, for example according to direct memory access (DMA). In addition, a pipeline unit 5000A or 5000B may be configured to pass information back to one or more previous (upstream) stages of the pipeline and/or to receive information passed back from one or more subsequent (downstream) stages of the pipeline. In addition, a pipeline unit 5000A or 5000B may be configured to pass information forward to one or more subsequent (downstream) stages of the pipeline and/or to receive information passed forward from one or more previous (upstream) stages of the pipeline.

As shown in FIG. 15C, two or more units 5000A as shown in FIG. 15A may be grouped together and configured to perform an operation in the pipeline. A single processor 5030 may be used to control and/or configure the pipeline units 5000A.

Example Block Processing Pipeline

FIG. 16 is a high-level block diagram of general operations in an example block processing method 6000 for H.264 encoding that may be implemented in stages by a block processing pipeline that may implement one or more of the block processing methods and apparatus as described herein, according to at least some embodiments. A block processing pipeline that implements the block processing method 6000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920×1080 pixels, 2.1 megapixels) encoded in YCbCr color space. However, other input video formats may be encoded into H.264 using embodiments of the pipeline in a video encoder apparatus.

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 16, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 15. An example SOC that includes a video encoder apparatus is illustrated in FIG. 16. While embodiments are generally described in relation to hardware implementations of a block processing pipeline that implements the block processing method 6000 with knight's order processing, note that the block processing method 6000 with knight's order processing may be implemented by a block processing pipeline implemented in software.

A pipeline that implements the method 6000 as shown in FIG. 16 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 6000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 6000 as shown in FIG. 16 that may be performed in stages by a pipeline, as well as general data flow through the pipeline, are briefly described below. Each of the general operations of the method 6000 may be implemented by one or more pipeline units at one or more stages of the pipeline. Example pipeline units are illustrated in FIGS. 13A through 13C. Also note that each general operation shown in FIG. 16 may be subdivided into two or more operations that may be implemented by pipeline units at one, two, or more stages of the pipeline. However, two or more of the operations shown in FIG. 16 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 16 and described below.

Macroblock Input

In at least some embodiments, macroblock input 6002 may be performed by an initial stage of the pipeline. In at least some embodiments, macroblock input 6002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 6010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's order processing.

In at least some embodiments, macroblock input 6002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 6010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 6010 operations may be subdivided into two or more sub-operations that may be performed at one, two, or more stages of the pipeline, with one or more components or pipeline units at each stage configured to perform a particular sub-operation.

In at least some embodiments, macroblock input 6002 reads neighbor data from the bottom row of a previous quadrow from memory at quadrow boundaries and passes the neighbor data to intra-frame and inter-frame estimation 6010, for example to an intra-frame estimation component. In addition, motion compensation and reconstruction 6030, for example a luma reconstruction component, may pass neighbor data as feedback to intra-frame and inter-frame estimation 6010, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 6020.

In at least some embodiments, motion estimation may also include a direct mode estimation component that receives co-located and spatial motion vector data and computes a direct/skip mode cost, which it provides to mode decision 6020. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, 8×16 and/or 16×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 6020.

In at least some embodiments, macroblock input 6002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 6020 may be implemented by a mode decision component at a stage of the pipeline that is downstream of the stage(s) that implement intra-frame and inter-frame estimation 6010 operations. However, in some embodiments, mode decision 6020 operations may be subdivided into two or more sub-operations that may be performed at one, two, or more stages of the pipeline, with one or more components or pipeline units at each stage configured to perform a particular sub-operation. In at least some embodiments, the mode decision 6020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 6020 component also performs all motion vector prediction. The motion vector prediction results may be used when estimating motion vector rate during mode decision. In at least some embodiments, the motion vector prediction results may also be fed back from the mode decision 6020 component to motion estimation, for example for use in direct mode estimation and motion vector rate estimation.

Motion Compensation and Reconstruction

In at least some embodiments, motion compensation and reconstruction 6030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 6030 may be subdivided into luma motion compensation and reconstruction and chroma motion compensation and reconstruction. In at least some embodiments, each of these sub-operations of motion compensation and reconstruction 6030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 6020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 6020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component. The coefficient data is sent to an ITQ technique implemented by the luma reconstruction component, and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 6010 for prediction of future blocks inside the current macroblock.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 6020 results. The chroma motion compensation component performs subpixel interpolation to generate a prediction block. Mode decision 6020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 6010 so that reconstructed pixels can be used during the estimation process. In at least some embodiments, if the best mode is in intra, intra chroma estimation may be performed. based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory.

In at least some embodiments, the deblocking filter component and the CAVLC encode component write neighbor data for the bottom row of a quadrow to a memory at quadrow boundaries. For the top row of a next quadrow, macroblock input 6002 may then read this neighbor data from the memory at quadrow boundaries and pass the neighbor data to at least one downstream stage of the pipeline.

Transcoder

In at least some embodiments, a transcoding operation may be performed by a transcoder 6050. The transcoder may be implemented as a functional component of the pipeline or as a functional component that is external to the pipeline. In at least some embodiments, the transcoder 6050 may perform a memory-to-memory conversion of a CAVLC (context-adaptive variable-length coding) encoded stream output by the pipeline to a CABAC (context-adaptive binary arithmetic coding) encoded stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 6050 handles stitching the start and end of each row to generate a continuous stream at macroblock row boundaries. In at least some embodiments, the pipeline may embed metadata in the CAVLC output stream to facilitate stitching of the rows by the transcoder 6050.

Example Video Encoder Apparatus

FIG. 17 is a block diagram of an example video encoder apparatus 7000, according to at least some embodiments. The video encoder apparatus 7000 may, for example, be implemented as an integrated circuit (IC) or as a subsystem on an IC such as a system-on-a-chip (SOC). In at least some embodiments, the video encoder apparatus 7000 may include a pipeline 7040 component, a processor 7010 component (e.g., a low-power multicore processor), a memory management unit (MMU) 7020, DMA 7030, and an interconnect 7050 such as a bus subsystem or fabric that interconnects the functional components of the apparatus. The processor 7010 component of the video encoder apparatus 7000 may, for example, perform frame-level control of the pipeline 7040 such as rate control, perform pipeline 7040 configuration including configuration of individual pipeline units within the pipeline 7040, and interface with application software via a driver, for example for video encoder 7000 configuration. The MMU 7020 may serve as an interface to external memory, for example for streaming video input and/or output. Pipeline 7040 component may access memory through MMU 7020 via DMA 7030. In some embodiments, the video encoder apparatus 7000 may include other functional components or units not shown in FIG. 17, or fewer functional components than those shown in FIG. 17. An example block processing method that may be implemented by pipeline 7040 component is shown in FIG. 16. An example a system-on-a-chip (SOC) that may include at least one video encoder apparatus 7000 is illustrated in FIG. 18.

Example System on a Chip (SOC)

Figure 18:
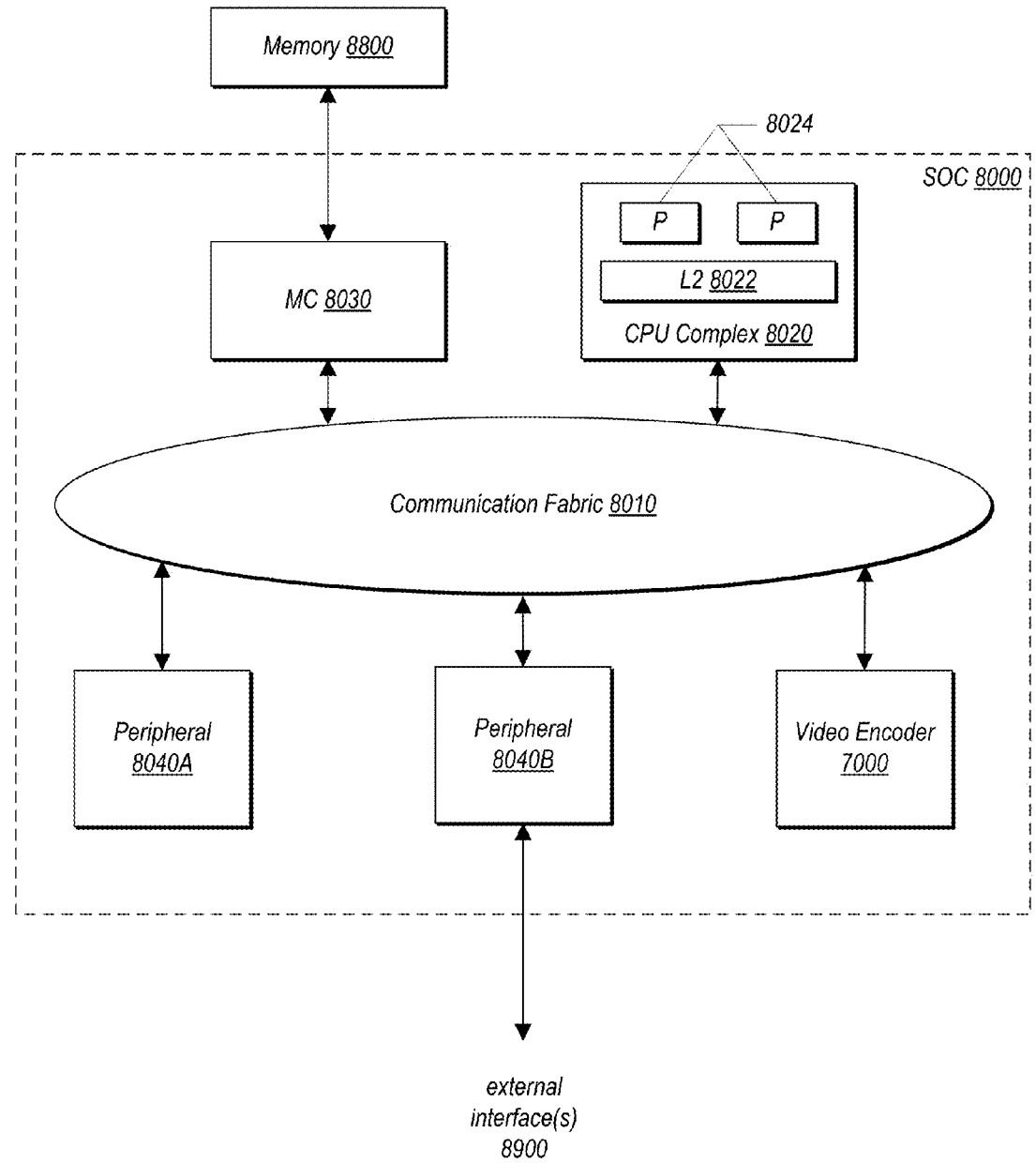
FIG. 18 is a block diagram of one embodiment of a system on a chip (SOC).

Turning now to FIG. 18, a block diagram of one embodiment of a system-on-a-chip (SOC) 8000 that may include at least one instance of a video encoder apparatus including a block processing pipeline that may implement one or more of the block processing methods and apparatus as illustrated in FIGS. 3 through 17. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040B (more briefly, "peripherals"), a memory controller (MC) 8030, a video encoder 7000 (which may itself be considered a peripheral component), and a communication fabric 8010. The components 8020, 8030, 8040A-8040B, and 7000 may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 18, SOC 8000 may include at least one instance of a video encoder 7000 component, for example a video encoder 7000 as illustrated in FIG. 17 that includes a block processing pipeline 7040 component that implements a block processing method 6000 as illustrated in FIG. 16. Video encoder 7000 may be an H.264 video encoder apparatus that may be configured to convert input video frames from an input format into H.264/Advanced Video Coding (AVC) format as described in the H.264/AVC standard. The block processing pipeline 7040 may implement one or more of the block processing methods and apparatus as described herein in relation to FIGS. 3 through 16.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding reaccess of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system (e.g. to the end points 16A-16B). Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 18, such as within the CPU complex 8020) may vary from embodiment to embodiment. There may be more or fewer of each component/subcomponent than the number shown in FIG. 18.

Example System

Figure 19:
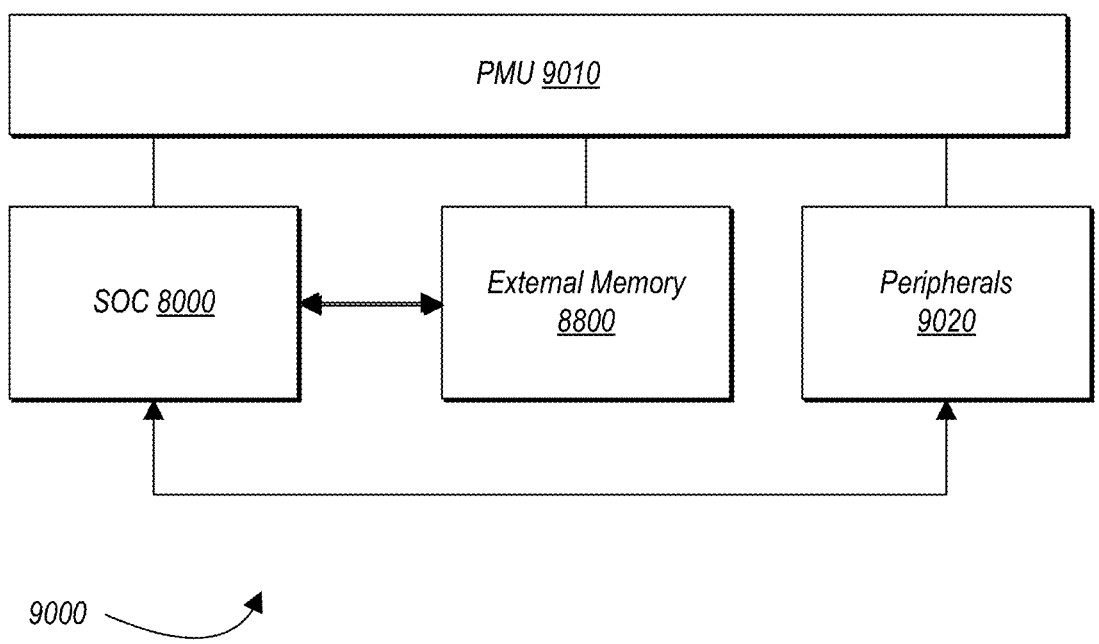
FIG. 19 is a block diagram of one embodiment of a system.

FIG. 19 a block diagram of one embodiment of a system 9000. In the illustrated embodiment, the system 9000 includes at least one instance of the SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a block processing pipeline comprising a plurality of stages, each stage configured to perform one or more operations on a block of pixels passing through the pipeline;
wherein the apparatus is configured to process blocks of pixels from a frame in the block processing pipeline so that adjacent blocks on a row are not concurrently at adjacent stages of the pipeline;
wherein at least one stage of the block processing pipeline is configured to:
receive, from an upstream stage of the pipeline, a current block of pixels for processing at the stage;
process the current block according to neighbor pixels from one or more neighbor blocks of the current block that were input to the pipeline for processing at pipeline cycles prior to input of the current block to the pipeline, wherein the neighbor pixels include left neighbor pixels from a left neighbor block of the current block received from a downstream stage of the pipeline, wherein the left neighbor block was input to the pipeline for processing at least three pipeline cycles prior to the current block; and
output the processed current block to a next stage in the pipeline.

2. The apparatus as recited in claim 1, wherein the neighbor pixels further include above neighbor pixels from one or more neighbor blocks on a row above the current block.

3. The apparatus as recited in claim 2, wherein the at least one stage is further configured to receive the previous row neighbor pixels from the upstream stage of the pipeline.

4. The apparatus as recited in claim 2, wherein the previous row neighbor pixels include at least one pixel from a top left neighbor block of the current block and at least one pixel from a top neighbor block of the current block.

5. The apparatus as recited in claim 2, wherein the at least one stage includes an intra-frame estimation stage configured to determine a best intra mode for the current block according to the neighbor pixels from the one or more neighbor blocks of the current block and output the determined best intra mode to a next stage in the pipeline.

6. The apparatus as recited in claim 5, wherein the downstream stage of the pipeline from which the left neighbor pixels from the left neighbor block of the current block are received is a luma reconstruction stage configured to reconstruct pixels of the left neighbor block according to input from one or more upstream stages and feed back reconstructed pixels from the reconstructed left neighbor block to the intra-frame estimation stage.

7. The apparatus as recited in claim 5, wherein, to determine a best intra mode for the current block, the intra-frame estimation stage is configured to:
process sub-blocks of the current block according to neighbor pixels of the sub-blocks;
process the current block according to the neighbor pixels from the one or more neighbor blocks; and
determine the best intra mode for the current block according to results of said processing the sub-blocks and the current block.

8. The apparatus as recited in claim 7, wherein the sub-blocks include 4×4 pixel sub-blocks and 8×8 pixel sub-blocks.

9. The apparatus as recited in claim 7, wherein, to process the sub-blocks, the intra-frame estimation stage is configured to:
reconstruct each sub-block according to a best mode determined for the respective sub-block; and
feed back reconstructed pixels from at least one of the reconstructed sub-blocks for use as neighbor pixels when processing at least one subsequent sub-block of the current block.

10. The apparatus as recited in claim 7, wherein, to process the sub-blocks, the intra-frame estimation stage is configured to process the sub-blocks in one or more sub-block processing pipelines of the intra-frame estimation stage, wherein sub-blocks are input to at least one of the sub-block processing pipelines according to a knight's order that enables at least some of the sub-blocks to be input to the sub-block processing pipeline without waiting for a previously input sub-block to complete processing in the sub-block processing pipeline, wherein inputting the sub-blocks in knight's order spaces the sub-blocks in the sub-block processing pipeline so that adjacent sub-blocks on a row are not concurrently processed at adjacent stages of the sub-block processing pipeline.

11. The apparatus as recited in claim 1, wherein the at least one stage processes only luma elements of the current block.

12. A method, comprising:
inputting blocks of pixels from an input frame to a block processing pipeline, wherein the pipeline includes a plurality of stages each configured to perform one or more operations on a block, wherein said inputting the blocks spaces the blocks in the pipeline so that adjacent blocks on a row are not concurrently at adjacent stages of the pipeline;
performing, by a stage of the block processing pipeline:
receiving, from an upstream stage of the pipeline, a current block of pixels for processing at the stage;
receiving neighbor pixels from one or more neighbor blocks of the current block that were input to the pipeline for processing at pipeline cycles prior to input of the current block to the pipeline, wherein the neighbor pixels include left neighbor pixels from a left neighbor block of the current block received from a downstream stage of the pipeline, wherein the left neighbor block was input to the pipeline for processing at least three pipeline cycles prior to the current block;
processing the current block according to the neighbor pixels from the one or more neighbor blocks of the current block; and
outputting the processed current block to a next stage in the pipeline.

13. The method as recited in claim 12, wherein the neighbor pixels further include above neighbor pixels from one or more neighbor blocks on a row above the current block received from an upstream stage of the pipeline.

14. The method as recited in claim 12, further comprising processing sub-blocks of the current block according to neighbor pixels of the sub-blocks, wherein the sub-blocks include 4×4 pixel sub-blocks and 8×8 pixel sub-blocks.

15. The method as recited in claim 14, wherein said processing sub-blocks of the current block comprises processing at least one sub-block according to neighbor pixels from a previously processed sub-block of the current block.

16. A device, comprising:
a memory; and
an apparatus configured to process video frames and to store the processed video frames as frame data to the memory, the apparatus comprising a block processing pipeline that implements a plurality of stages each comprising one or more pipeline units, each pipeline unit configured to perform one or more operations on a block of pixels from a frame passing through the pipeline;
wherein each frame is subdivided into rows and columns of blocks of pixels, wherein the apparatus is configured to input the blocks of pixels from each frame to the block processing pipeline so that adjacent blocks on a row are not concurrently at adjacent stages of the pipeline;
wherein at least one of the pipeline units in the block processing pipeline is configured to:
obtain a block of pixels for processing at the pipeline unit;
obtain neighbor pixels from one or more neighbor blocks of the block, wherein the neighbor pixels include left neighbor pixels from a left neighbor block of the block received from a downstream stage of the pipeline, wherein the left neighbor block was input to the pipeline for processing at least three pipeline cycles prior to the current block;
process the block according to the neighbor pixels from the one or more neighbor blocks of the block; and
output information from the processed block to one or more other pipeline units in the pipeline.

17. The device as recited in claim 16, wherein the neighbor pixels further include above neighbor pixels from one or more neighbor blocks on a row above the block received from an upstream stage of the pipeline.

18. The device as recited in claim 16, wherein the at least one pipeline unit is further configured to process sub-blocks of the block according to neighbor pixels of the sub-blocks, wherein the sub-blocks include 4×4 pixel sub-blocks and 8×8 pixel sub-blocks.

19. The device as recited in claim 18, wherein, to process sub-blocks of the block the at least one pipeline unit is further configured to process at least one sub-block according to neighbor pixels from a previously processed sub-block of the block.

20. The device as recited in claim 16, wherein the at least one pipeline unit includes a pipeline unit that implements intra-frame estimation to determine a best intra mode for the block according to the neighbor pixels from the one or more neighbor blocks of the block, and wherein the downstream stage of the pipeline from which the left neighbor pixels from the left neighbor block of the block are received is configured to reconstruct blocks according to input from one or more upstream stages and feed back reconstructed pixels from the reconstructed blocks to the pipeline unit that implements intra-frame estimation.

* * * * *